United States Patent [19]

Tsutsumida

[11] Patent Number: 5,890,704
[45] Date of Patent: Apr. 6, 1999

[54] FLUID-FILLED ELASTIC CYLINDRICAL MOUNT USING SPLIT OUTER SLEEVE WITH SEALING MEMBERS

[75] Inventor: Joji Tsutsumida, Komaki, Japan

[73] Assignee: Tokai Rubber Industries, Ltd., Japan

[21] Appl. No.: 642,073

[22] Filed: May 1, 1996

[51] Int. Cl.[6] .................................................. F16F 9/00
[52] U.S. Cl. .................................. 267/140.12; 267/141.2
[58] Field of Search ..................... 267/140.11, 140.12, 267/141, 141.3, 141.4, 141.5, 141.7, 219, 35, 141.2, 276, 281; 180/300, 3.2, 902; 248/562, 636, 638

[56] References Cited

U.S. PATENT DOCUMENTS

| 2,744,718 | 5/1956 | Markowski et al. ............... 267/140.11 |
| 4,178,811 | 12/1979 | Shepard . |
| 4,200,004 | 4/1980 | Bremer, Jr. . |
| 4,339,963 | 7/1982 | Bremer, Jr. . |
| 4,768,760 | 9/1988 | Le Fol ................................ 248/562 X |
| 4,883,260 | 11/1989 | Kanda ............................... 267/140.12 |
| 5,065,869 | 11/1991 | Doi et al. ........................... 267/140.11 |
| 5,149,067 | 9/1992 | Frühauf et al. ..................... 248/562 X |
| 5,489,086 | 2/1996 | Kanada .............................. 264/140.12 |

FOREIGN PATENT DOCUMENTS

| 0 415 001 A | 6/1991 | European Pat. Off. . |
| 56-164242 | 12/1981 | Japan . |
| 4-5126 | 1/1992 | Japan . |
| 7-293 627 A | 11/1995 | Japan . |
| 93 08414 | 4/1993 | WIPO ..................................... 267/141 |

*Primary Examiner*—Robert J. Oberleitner
*Attorney, Agent, or Firm*—Parkhurst & Wendel

[57] ABSTRACT

A fluid-filled elastic cylindrical mount including (a) a core portion including a center shaft member, an intermediate sleeve disposed radially outwardly of the center shaft member, and an elastic body interposed between and connecting the center shaft member and the intermediate sleeve, (b) and an outer sleeve portion having a cylindrical bore in which the core portion is fixedly received, whereby pockets formed in the core portion are closed by the outer sleeve portion to provide fluid chambers, the outer sleeve portion consisting of a plurality of sections having respective part-cylindrical inner surfaces cooperating to define the cylindrical bore, and respective pairs of axially extending abutting surfaces which are contiguous to the part-cylindrical surfaces and at which the sections are butted together, and wherein a sealing member is squeezed by and between the abutting surfaces, and the sections have respective fixing portions which are spaced apart from the sealing member and at which the sections are fixed to each other.

22 Claims, 16 Drawing Sheets

FLUID-FILLED ELASTIC CYLINDRICAL MOUNT USING SPLIT OUTER SLEEVE WITH SEALING MEMBERS

BACKGROUND OF THE INVENTION

1. Field of the Invention

The present invention relates to a fluid-filled elastic cylindrical mount or bushing which is suitably usable as an automobile engine mount or suspension bushing and which exhibits a desired vibration damping effect based on flow of a fluid therethrough.

2. Discussion of the Related Art

As one type of a vibration damping elastic bushing or mount interposed between two members of a vibration system, there is known a fluid-filled elastic cylindrical mount as disclosed in JP-A-56-164242, comprising: a generally cylindrical core portion including a center shaft member fixed to one of the two members of the vibration system, an intermediate sleeve disposed radially outwardly of the center shaft member with a predetermined radial spacing therebetween, and an elastic body interposed between and connecting the center shaft member and the intermediate sleeve, the core portion having at least one pocket open in the outer circumferential surface thereof; and an outer sleeve portion fixed to the other of the two members of the vibration system and having a cylindrical bore in which the core portion is fixedly received, whereby the center shaft member and the outer sleeve portion are elastically connected to each other by the elastic body, and the at least one pocket is closed by the outer sleeve portion to provide at least one fluid chamber filled with a non-compressible fluid. The elastic cylindrical mount constructed as described above can be readily adapted to be capable of exhibiting an excellent vibration damping effect based on resonance or flows of the non-compressible fluid therethrough, which effect would not be obtained from the elasticity of the elastic body alone, in the absence of the fluid. Thus, the fluid-filled elastic cylindrical mount has been widely used as an engine mount or suspension bushing for automotive vehicles.

Such fluid-filled elastic cylindrical mounts are required to have a sufficient degree of fluid tightness to prevent leakage of the non-compressible fluid from the fluid chamber. To this end, a sealing member is interposed between the intermediate sleeve of the core portion and the outer sleeve portion, and is squeezed by and between the intermediate sleeve and the outer sleeve portion.

In assembling the mount, the core portion is press-fitted in the bore of the outer sleeve portion. The sealing member interposed between the intermediate sleeve and the outer sleeve portion tends to be damaged due to a force applied thereto upon press-fitting of the core portion in the outer sleeve portion. Accordingly, the conventional mount suffers from difficulty in securing high stability in its fluid tightness. Where the outer sleeve portion is an outer sleeve formed of a metallic material, the mount may be assembled by drawing the metallic outer sleeve radially inwards onto the outer circumferential surface of the core portion. However, the drawing operation requires an expensive device, and is cumbersome or difficult to perform, resulting in an undesirably high cost of manufacture of the mount.

It is considered possible to use a split outer sleeve portion consisting of a plurality of part-cylindrical sections. When the cylindrical mount is assembled, these part-cylindrical sections are placed on the outer circumferential surface of the core portion and are butted together at abutting end faces thereof along straight lines substantially parallel to the axis of the mount, so that the sections are arranged in the circumferential direction of the mount. The part-cylindrical sections are fixed to each other by bonding, welding, fastening or any other suitable means. This method permits simultaneous formation and fluid-tight assembling of the outer sleeve portion on the core portion, while preventing damage of the sealing member during the assembling, and eliminating an expensive device such as a drawing device, whereby the production efficiency of the mount is significantly improved.

A further study by the present inventor of the fluid-filled elastic cylindrical mount using the outer sleeve portion consisting of a plurality of part-cylindrical sections has revealed difficulty to fix the part-cylindrical sections to each other at their circumferential ends while assuring a high degree of fluid tightness at the abutting end faces. Thus, this mount has a potential problem of difficulty in obtaining high stability in its performance and operating reliability.

SUMMARY OF THE INVENTION

It is therefore an object of the present invention to provide a fluid-filled elastic cylindrical mount which not only has excellent fluid-tightness to prevent leakage of the non-compressible fluid but also permits sufficiently high efficiency of production.

The above object may be achieved according to the principle of the present invention, which provides a fluid-filled elastic cylindrical mount to be interposed between two members of a vibration system, the mount comprising: (a) a generally cylindrical core portion including a center shaft member fixed to one of the two members, an intermediate sleeve disposed radially outwardly of the center shaft member with a predetermined radial spacing therebetween, and an elastic body interposed between and connecting the center shaft member and the intermediate sleeve, the core portion having at least one pocket open in an outer circumferential surface thereof; and (b) an outer sleeve portion fixed to the other of the two members and having a cylindrical bore in which the core portion is fixedly received, whereby the center shaft member and the outer sleeve portion are elastically connected to each other by the elastic body, and the at least one pocket is closed by the outer sleeve portion to provide at least one fluid chamber filled with a non-compressible fluid, the present mount being characterized in that the outer sleeve portion consists of a plurality of sections having respective part-cylindrical inner surfaces which cooperate to define the cylindrical bore, and these sections have respective pairs of abutting surfaces which extend substantially in parallel with an axis of the outer sleeve portion and at which the sections are butted together, the abutting surfaces being contiguous to the part-cylindrical inner surfaces. The present mount is further characterized in that there is provided a sealing member which is squeezed by and between the abutting surfaces of each set of two adjacent ones of the plurality of sections, and in that the plurality of sections have respective fixing portions which are spaced apart from the sealing member and at which the sections are fixed to each other.

In the fluid-filled elastic cylindrical mount of the present invention constructed as described above, the outer sleeve portion is a split structure consisting of the two or more sections which are butted together and fixed to each other by welding, bonding or any other fastening means at their abutting surfaces and are fitted on the outer circumferential surface of the core portion. Thus, the outer sleeve portion is simultaneously assembled and fitted on the core portion so as to provide the fluid-filled elastic cylindrical mount. The present mount does not require a conventionally required operation to press-fit the core portion within the outer sleeve portion, and eliminates a cumbersome operation for drawing the outer sleeve portion onto the core portion, and an expensive device for such drawing operation, whereby the production efficiency and cost of the present mount are remarkably improved and lowered, respectively.

It is also noted that the suitable sealing member is interposed and squeezed between the abutting surfaces of the constituent sections, which abutting surfaces are contiguous to the part-cylindrical inner surfaces which cooperate to define the cylindrical bore in which the core portion is fixedly received. Accordingly, the present mount assures a sufficiently high degree of fluid-tightness at the interfaces of the part-cylindrical sections with high stability, thereby exhibiting excellent damping performance and operating reliability.

In the present cylindrical mount, the fixing portions of the constituent sections of the outer sleeve portion are spaced apart from the sealing members, so that an operation to fix the sections together at their fixing portions and fixing members or means for fixing the sections will not have an adverse influence on the sealing members, enabling the sealing members to provide the fluid tightness of the mount with high stability.

According to a first preferred form of this invention, at least one of the plurality of sections of the outer sleeve portion has an integrally formed inward projection extending from the part-cylindrical inner surface in a radially inward direction thereof. This inward projection may be suitably constructed and shaped. For instance, the inward projection may be formed with a suitable height so as to project toward the center shaft member and function as a stopper portion for abutting contact with the center shaft member to thereby limit an amount of relative radial displacement between the center shaft member and the outer sleeve portion. Alternatively, the inward projection may be formed so as to be positioned within the elastic body, for restricting elastic deformation or displacement of the elastic body, or alternatively formed as a reinforcing rib for increasing the strength of the outer sleeve portion per se. The inward projection may have a selected one or more of the functions indicated above.

In the above first preferred form of the invention wherein the inward projection projecting into the cylindrical bore of the core portion and having a desired function or functions such as a stopper function is formed integrally with the outer sleeve portion, the overall function of the fluid-filled elastic cylindrical mount can be enhanced, without undesirably increasing the number of the required components and the number of process steps required to be performed during the manufacture.

According to one advantageous arrangement of the above first preferred form of the invention, the inward projection is positioned so as to project into the fluid chamber or chambers. In this case, the inward projection may serve as a block which cooperates with the inner surface of the fluid chamber to define a restricted fluid passage for damping vibrations in a selected frequency range, such as booming noises or other high-frequency vibrations. Alternatively, the inward projection may be used as a stopper portion which is abuttable on the center shaft member to limit the amount of relative radial displacement between the center shaft member and the outer sleeve portion, as indicated above.

In the above arrangement wherein the inward projection is formed integrally with the selected one of the plurality of sections of the outer sleeve portion, the cylindrical mount can be given a desired additional function or functions such as damping of high-frequency vibrations based on resonance of the fluid through a restricted fluid passage as indicated above, without having to increase the numbers of the components and manufacturing process steps. Further, the provision of the inward projection will not disturb the assembling of the outer sleeve portion, since the sections of the outer sleeve portion are moved relative to each other in the radially inward direction upon assembling of the sections on the outer circumferential surface of the core portion. Thus, the present arrangement assures relatively high efficiency of production.

According to a second preferred form of this invention, at least one of the plurality of sections of the outer sleeve portion is formed of a thermoplastic resin material, and the sections are fixed to each other at the fixing portions by welding. From the standpoint of the material strength and cost, the thermoplastic resin material is preferably selected from among nylon 66, PBT (polybutylene terephthalate), PPS (polyphenylene sulfide), and such resin materials which are fiber-reinforced. For a part of the outer sleeve portion which is exposed to the non-compressible fluid, it is desirable to select the thermoplastic resin material which has a relatively high corrosion resistance and relatively low water absorbing property. The section or sections of the outer sleeve portion which is/are not formed of a thermoplastic resin material may be formed of a thermosetting resin material, or a metallic material such as an aluminum alloy. Where the outer sleeve portion includes a section or sections formed of a material other than the thermoplastic resin material, the constituent sections of the outer sleeve portions are fixed to each other preferably by welding and riveting, for example.

In the second preferred form of the invention wherein the thermoplastic resin material is used for at least one of the sections of the outer sleeve portion, the weight and cost of the outer sleeve portion can be effectively reduced, and the constituent sections of the outer sleeve portions can be comparatively easily and efficiently fixed together by welding and riveting.

According to a third preferred form of the present invention, all of the plurality of sections of the outer sleeve portion are formed of a thermoplastic resin material, and the sections are fixed to each other at the fixing portions by direct ultrasonic welding, preferably by spot welding using a ultrasonic welding process.

In the above third preferred form of the invention wherein all of the sections of the outer sleeve portions are formed of a thermoplastic resin material, the weight and cost of the outer sleeve portion can be further effectively reduced. Further, the ultrasonic welding to fix the sections together does not cause heat generation in the outer sleeve portion, except at the fixing portions of the constituent sections, whereby the non-fixing portions are protected from an adverse influence of heat.

According to a fourth preferred form of this invention, all of the plurality of sections of the outer sleeve portion are formed of a thermoplastic resin material, and the sections are fixed to each other at the fixing portions by metallic attaching members which are welded to the fixing portions for attaching the outer sleeve portion to the other of the two members of the vibration system. In this case, the metallic attaching members for attaching the outer sleeve portion to the other member of the vibration system are utilized to fix the constituent sections of the outer sleeve portion to each other. Accordingly, no special welding operation is required for the sole purpose of fixing the sections together to provide the outer sleeve portion.

According to a fifth preferred form of the invention, the plurality of sections of the outer sleeve portion consist of a first member and a second member which have respective two first pairs of abutting surfaces and respective two second pairs of abutting surfaces. The two first pairs of abutting surfaces provide the respective pairs of abutting surfaces contiguous to the part-cylindrical inner surfaces which define the cylindrical bore. The abutting surfaces of each of the two pairs extend from a cylindrical inner surface of the cylindrical bore in a first diametric direction of the cylindrical bore. The abutting surfaces of each of the two second pairs extend in a direction parallel to a second diametric direction of the cylindrical bore which is substantially perpendicular to the first diametric direction. The first and second members are butted together at the two first pairs of abutting surfaces in the second diametric direction, and at the two second pairs of abutting surfaces in the first diametric direction. Where the abutting surfaces of the second pairs of the first and second members have a relatively large area, it is desirable to provide suitable amounts of gaps between these abutting surfaces.

In the above fifth preferred form of this invention, the first pair of abutting surfaces of the first member extending in the first diametric direction are held in abutting contact with the first pair of abutting surfaces of the second member also extending in the first diametric direction. On the other hand, the second pair of abutting surfaces of the first member extending in the direction parallel to the second diametric direction substantially perpendicular to the first diametric direction are held in abutting contact with the second pair of abutting surfaces of the second member also extending the direction parallel to the second diametric direction. This arrangement assures a sufficient strength of the outer sleeve portion with respect to vibrational loads that are applied between the center shaft member and the outer sleeve portion in various radial directions of the mount. Further, the present arrangement is effective to prevent deformation of the cylindrical bore of the core portion due to relative displacement of the first and second members of the outer sleeve portion, thereby assuring significantly increased stability of fluid tightness at the interface between the core portion and the outer sleeve portion.

According to a sixth preferred form of this invention, the plurality of sections of the outer sleeve portion consist of a first member held in abutting contact with the above-indicated other of the two members of the vibration system, and a second member which is partially superposed on the first member and which is fixed to the other member of the vibration system, with the first member being interposed between the other member and the second member.

In the above sixth preferred form of the invention, the first and second members of the outer sleeve portion are attached to the above-indicated other member of the vibration system such that the first member is interposed between the other member of the vibration system and the second member, so that a vibrational load is applied between the other member and the second member which is fixed to the other member. Accordingly, this arrangement is effective to avoid direct application of the vibrational load between the abutting surfaces of the first and second members of the outer sleeve portion, thereby assuring prolonged durability of the mutually abutting parts of the first and second members of the outer sleeve portion.

According to a seventh preferred form of this invention, the outer sleeve portion includes an integrally formed bracket at which the outer sleeve portion is fixed to the other of the two members of the vibration system. In other words, the outer sleeve portion consists of an outer sleeve consisting of the two or more sections, and the bracket formed integrally with the outer sleeve. In this case, the numbers of the components and manufacturing process steps and the cost of manufacture of the mount are effectively reduced.

According to an eighth preferred form of the invention, the outer sleeve portion has a fluid injecting hole formed therethrough for injecting the non-compressible fluid into the at least one fluid chamber, and the outer sleeve portion includes a closure member which closes the fluid injection hole and which is fixed to the outer sleeve portion by welding. In this case, the fluid can be injected into the mount after the core portion and the outer sleeve portion are assembled into the mount, and therefore, the assembling can be easily achieved. The closure member which is welded to the outer sleeve portion so as to close the injection hole assures excellent fluid tightness with high stability.

According to an alternative ninth preferred form of this invention, the plurality of sections of the outer sleeve portion are fixed to each other and fitted on an outer circumferential surface of the core portion within a mass of the non-compressible fluid, so that the at least one fluid chamber is filled with the non-compressible fluid. In this case, the assembling of the sections into the outer sleeve portion on the core portion and the filling of the fluid chamber or chambers with the non-compressible fluid can be effected simultaneously, leading to improved efficiency of production of the mount.

According to a tenth preferred form of this invention, the mount has a plurality of fluid chambers, and the core portion has at least one groove formed in an outer circumferential surface thereof and closed by the outer sleeve portion to define at least one orifice passage for fluid communication between the plurality of fluid chambers. This arrangement eliminates a member exclusively used to form the orifice passage or passages, and accordingly contributes to simplification of the structure of the mount, reduction of the number of the required components, and resulting reduction of the cost of manufacture of the mount. The groove may be formed in a sealing layer formed on the outer circumferential surface of the intermediate sleeve.

Alternatively, the orifice passage or passages may be provided by at least one groove which is formed in the inner circumferential surface of the outer sleeve portion and which is closed by the outer circumferential surface of the core portion. This alternative arrangement provides substantially the same advantages as described just above. Further, the groove or grooves can be comparatively easily formed in the part-cylindrical inner surfaces of the appropriate sections of the outer sleeve portion before these sections are fixed together into the outer sleeve portion. The provision of such groove or grooves in the separate sections of the outer sleeve portion will not considerably lower the production efficiency of the mount.

According to an eleventh preferred form of this invention, the sealing member is formed integrally with the core portion such that the sealing member protrudes from an outer circumferential surface of the core portion. This arrangement is effective to reduce the number of the components of the mount, and facilitates the assembling of the mount, without a need of forming the sealing member separately from the core portion, whereby the manufacturing efficiency of the mount is improved and the cost of manufacture is lowered. In addition, the sealing member integral with the core portion prevents a gap which would otherwise be left between the outer circumferential surface of the core portion and the sealing member, whereby the sealing member performs a sealing function with increased stability.

According to a twelfth preferred form of this invention, the sealing member extends over a substantially entire axial length of the core portion, so that the sealing effect provided by the sealing member is further improved.

According to a thirteenth preferred form of this invention, the core portion has two circumferential sealing layers which are formed on an outer circumferential surface of the intermediate sleeve and which are disposed on opposite sides of the at least one pocket as viewed in an axial direction of the intermediate sleeve. These circumferential sealing layers are squeezed by and between the outer circumferential surface of the intermediate sleeve and the part-cylindrical inner surfaces of the sections of the outer sleeve portion. In this case, the fluid tightness is provided not only at the abutting surfaces of the sections of the outer sleeve portion, but also between the outer circumferential surface of the core portion and the inner circumferential surface of the outer sleeve portion.

According to a fourteenth preferred form of this invention, the outer sleeve portion includes at least one integrally formed engaging projection each of which engages the core portion and which is adjacent to a portion of the intermediate sleeve in an axial direction of the intermediate sleeve. In this case, the engaging projection is effective to prevent the core portion and the outer sleeve portion from being moved relative to each other in the axial direction, improving a resistance of the mount to a load in the axial direction.

In a first advantageous arrangement of the above fourteenth preferred form of the invention, the mount further comprises an axial sealing layer which is squeezed by and between the intermediate sleeve and each engaging projection in the axial direction. This axial sealing layer improves the fluid tightness between the intermediate sleeve and the outer sleeve portion having the engaging projection.

According to a second advantageous arrangement of the fourteenth preferred form, each of the at least one engaging projection projects into the at least one pocket and engages an axial end of the intermediate sleeve.

According to a third advantageous arrangement of the fourteenth preferred form, the intermediate sleeve has a recess in an outer circumferential surface thereof, and each of the at least one engaging projection is positioned within the recess.

In the above second and third advantageous arrangements, the engaging projection may be provided at an axially intermediate part of the outer sleeve portion, whereby the provision of the engaging projection does not increase the axial length of the outer sleeve portion.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
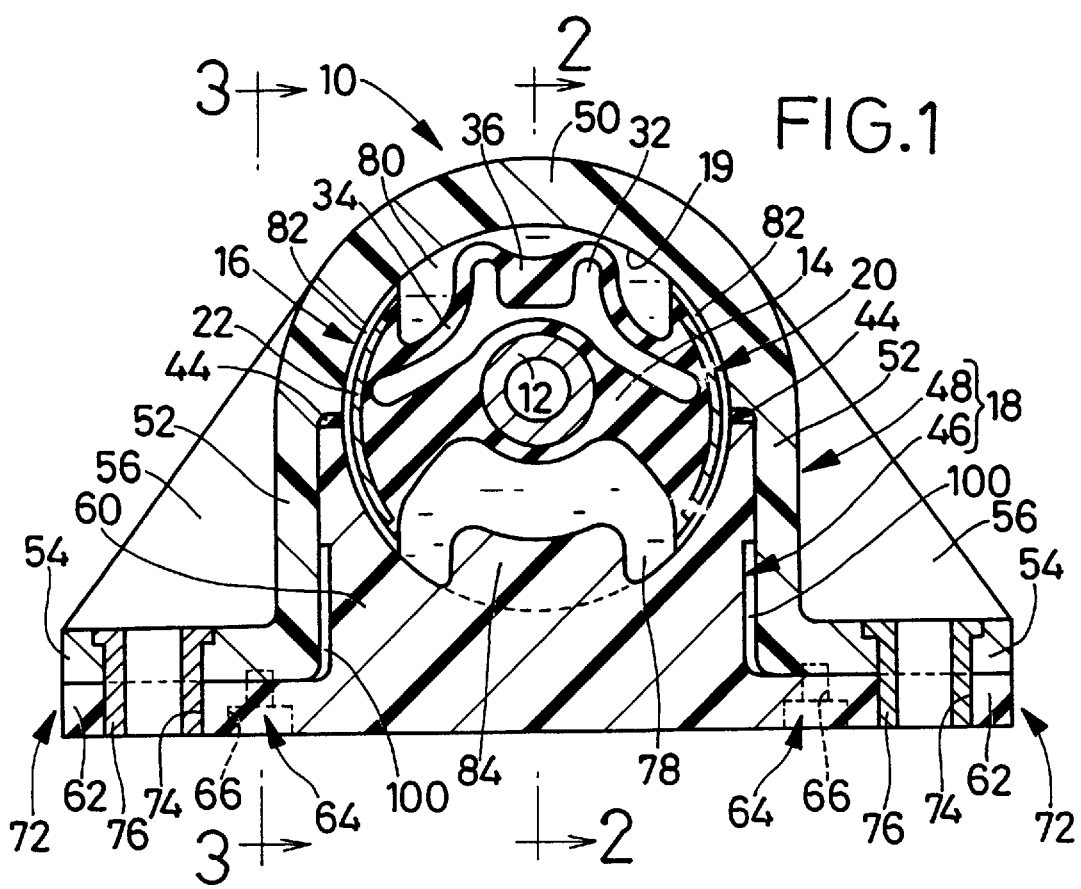
FIG. 1 is an elevational view in transverse cross section of one embodiment of a fluid-filled elastic cylindrical mount of the present invention in the form of an automobile engine mount.
Figure 2:
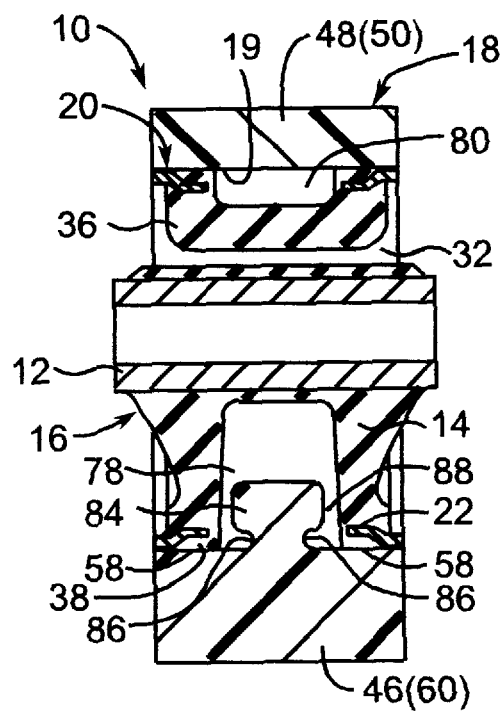
FIG. 2 is a cross sectional view taken along line 2—2 of FIG. 1.
Figure 3:
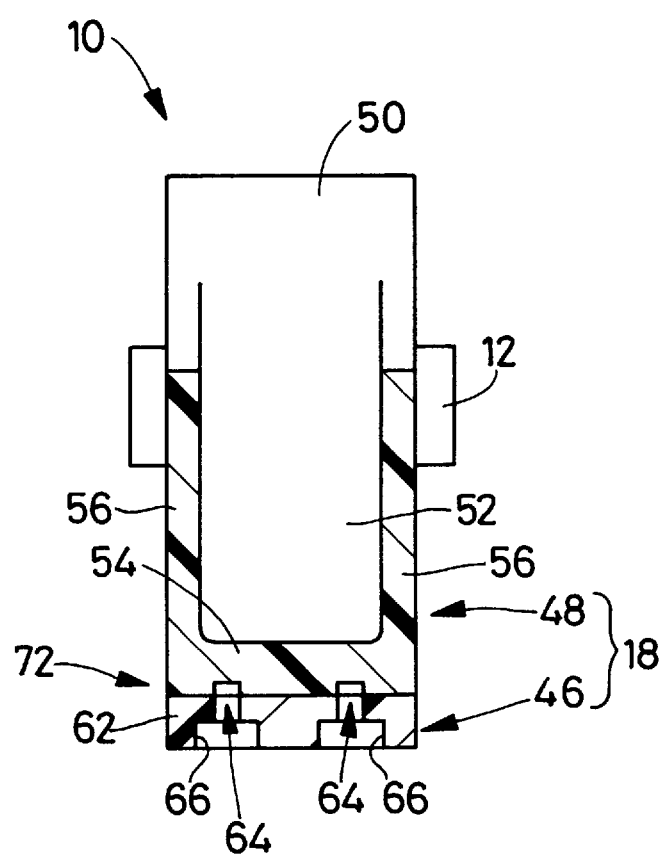
FIG. 3 is a cross sectional view taken along line 3—3 of FIG. 1.

Referring first to FIGS. 1–3, there is shown one embodiment of a fluid-filled elastic cylindrical mount of this invention in the form of an engine mount 10 for an automotive vehicle. This engine mount 10 consists of a core portion 16, and an outer sleeve portion in the form of an outer sleeve assembly 18 having a cylindrical bore 19 in which the core portion 16 is fixedly received. The core portion 16 includes a center shaft member in the form of an inner sleeve 12, an intermediate sleeve 20 disposed radially outwardly of the inner sleeve 12 with a predetermined radial spacing therebetween, and an elastic body 14 interposed between the inner sleeve 12 and the intermediate sleeve 20. In the present engine mount 10, the inner sleeve 12 is elastically connected to the outer sleeve assembly 18 by the elastic body 14.

The engine mount 10 is installed on the automotive vehicle, for supporting a power unit (including an engine) to the body of the vehicle in a vibration damping manner, such that the outer sleeve assembly 18 is fixed to the vehicle body, while the inner sleeve 12 of the core portion 16 is fixed to the power unit. The vehicle is considered to be a vibration system, and the engine mount 10 is used as a fluid-filled elastic cylindrical mount to be interposed between the two members of the vibration system, namely, the power unit and the vehicle body. Before the engine mount 10 is installed on the vehicle, the axis of the inner sleeve 12 and the axis of the outer sleeve assembly 18 are radially offset from each other by a suitable distance. When the engine mount 10 is installed on the vehicle such that the engine mount 12 is interposed between the inner sleeve 10 and the outer sleeve assembly 18, the weight of the power unit acts on the inner sleeve 12, with a result of elastic deformation of the elastic body 14 so that the inner sleeve 12 is brought into a substantially coaxial or concentric relationship with the outer sleeve assembly 18. The engine mount 10 is adapted to damp primarily a vibrational load applied in a diametric direction (in the vertical direction as seen in FIG. 1) in which the inner sleeve 12 and the outer sleeve assembly 18 are offset from each other prior to the installation of the engine mount 10 on the vehicle. This diametric direction will be referred to as "a load-receiving direction" where appropriate.

The inner sleeve 12 is a cylindrical hollow member made of a metallic material and having a bore through which a fixing rod is inserted for fixing the inner sleeve 12 to the power unit.

Figure 4:
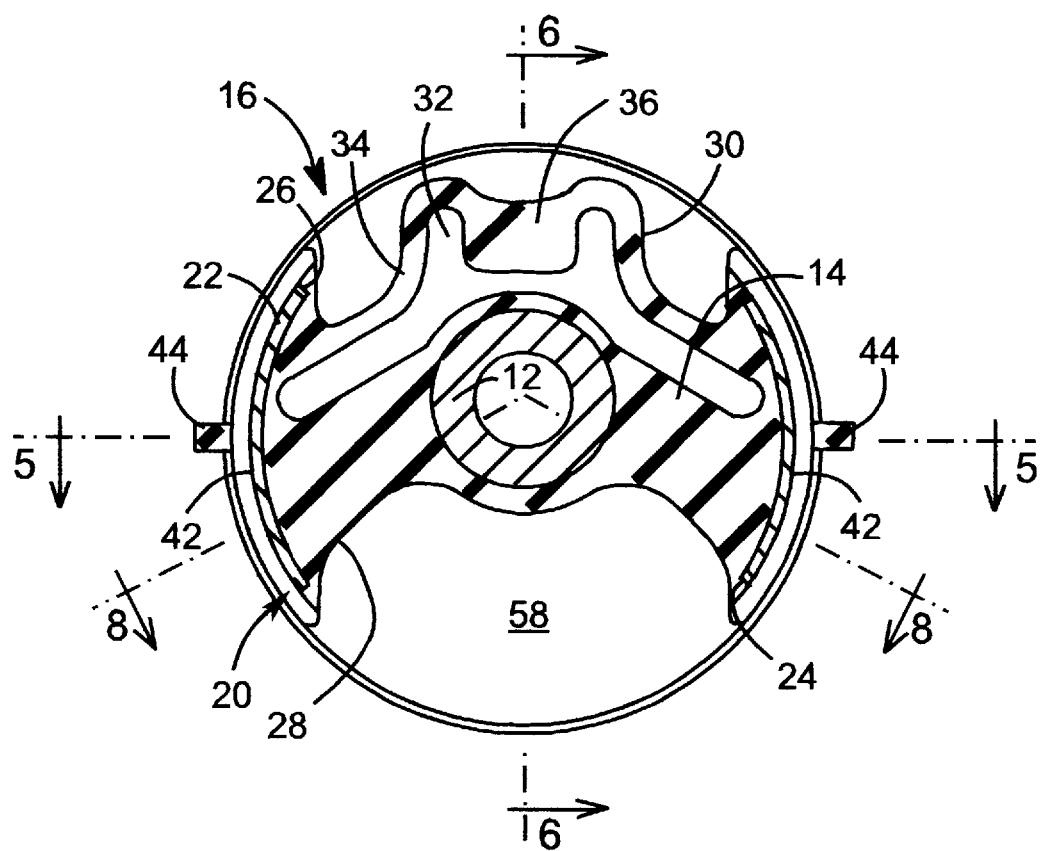
FIG. 4 is an elevational view in transverse cross section of a core portion of the engine mount of FIG. 1.
Figure 5:
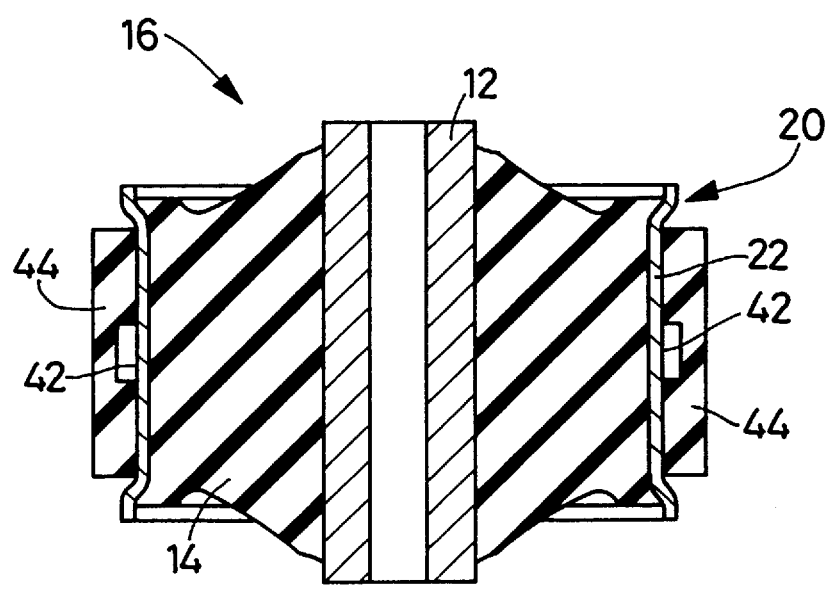
FIG. 5 is a cross sectional view taken along line 5—5 of FIG. 4.
Figure 6:
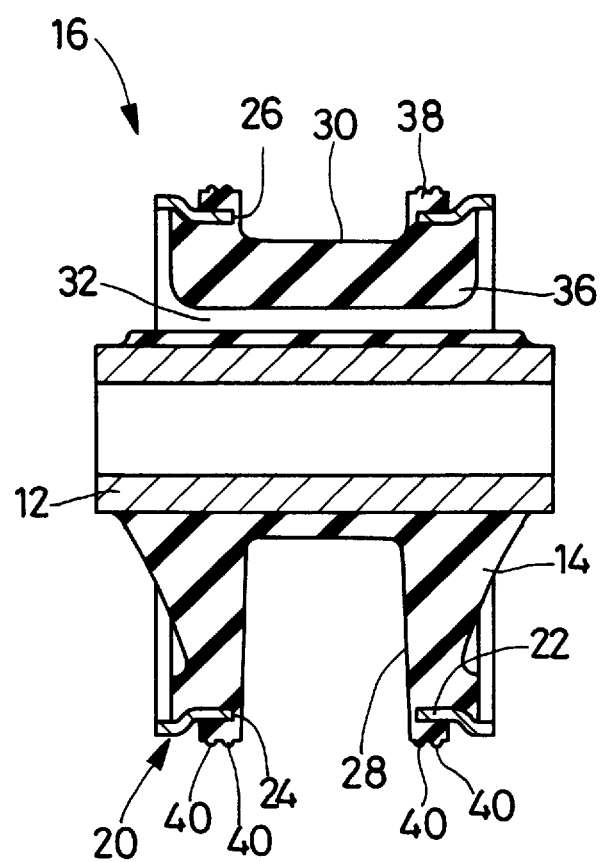
FIG. 6 is a cross sectional view taken along line 6—6 of FIG. 4.

The intermediate sleeve 20 disposed radially outwardly of the inner sleeve 12 is also radially offset from the inner sleeve 12, and consists of a generally cylindrical member having a relatively large diameter and a relatively small wall thickness. The intermediate sleeve 20 is radially inwardly recessed at an axially intermediate portion so as to provide an annular recess 22 as shown in FIGS. 4 and 5. The annular recess 22 has a large axial dimension and is formed with a first window 24 and a second window 26 formed in an axial intermediate part thereof, as shown in FIGS. 4 and 6. The first and second windows 24, 26 are opposed to each other in one diametric direction of the intermediate sleeve 20 parallel parallel to the load-receiving direction indicated above (vertical direction as seen in FIGS. 1, 2 and 4). In the present embodiment, the intermediate sleeve 20 is made of a metallic material. However, the sleeve 20 may be made of a synthetic resin material.

The elastic body 14 interposed between the inner and intermediate sleeves 12, 20 has a generally annular shape and a relatively large wall thickness. The core portion 16 consisting of these three members 12, 14, 20 is formed as an integral structure, by vulcanization of a rubber material to form the elastic body 14 within a suitable mold in which the inner and intermediate sleeves 12, 20 are suitably positioned relative to each other. In the vulcanization process, the elastic body 14 is bonded at its inner circumferential surface to the inner sleeve 12 and at its outer circumferential surface to the intermediate sleeve 20. Thus, the core portion 16 as shown in FIGS. 4-8 is produced.

The elastic body 14 has a first pocket 28 and a second pocket 30 which are open in the outer circumferential surface of the core portion 16 through the first and second windows 24, 26 of the intermediate sleeve 20, respectively. That is, the first and second pockets 28, 30 are opposed to each other in a diametric direction of the core portion 16 parallel to the load-receiving direction, and located on the diametrically opposite sides of the inner sleeve 12. The elastic body 14 has a void 32 formed between the inner sleeve 12 and the second pocket 30 such that the void 32 provides a bottom wall 34 of the second pocket 30. The void 32, which extends through the entire axial length of the elastic body 14, permits the bottom wall 32 to be easily deformable. The bottom wall 34 has a middle portion in the form of an integrally formed rubber buffer portion 36. This buffer portion 36 has a larger thickness than the other portion of the bottom wall 34, and extends radially inwards into the void 32.

Figure 7:
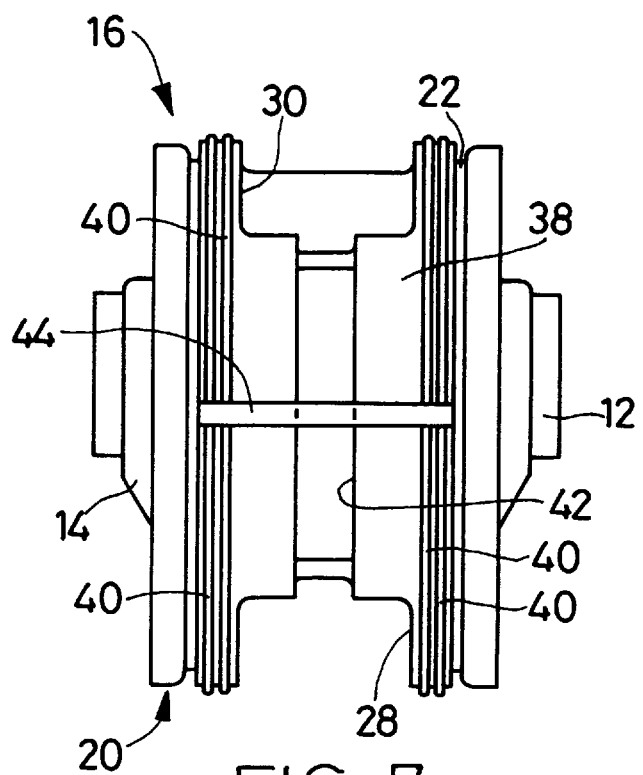
FIG. 7 is a right side elevational view of the core portion of FIG. 4.

Two sealing rubber layers 38 are formed on the axially opposite end portions of the outer circumferential surface of the recessed portion of the intermediate sleeve 20, such that the sealing rubber layers 38 are located within the recess 22 and have a thickness slightly larger than the depth of the recess 22, as shown in FIGS. 5–8. These two sealing rubber layers 38 serve as circumferential sealing layers which are disposed on the opposite sides of the first and second windows 24, 26 (first and second pockets 28, 30) as indicated in FIGS. 6 and 7. Each of the sealing rubber layer 38 has a plurality of circumferential sealing lips 40 formed on its outer circumferential surface, at its axially outer end portion, as shown in FIG. 6.

Figure 8:
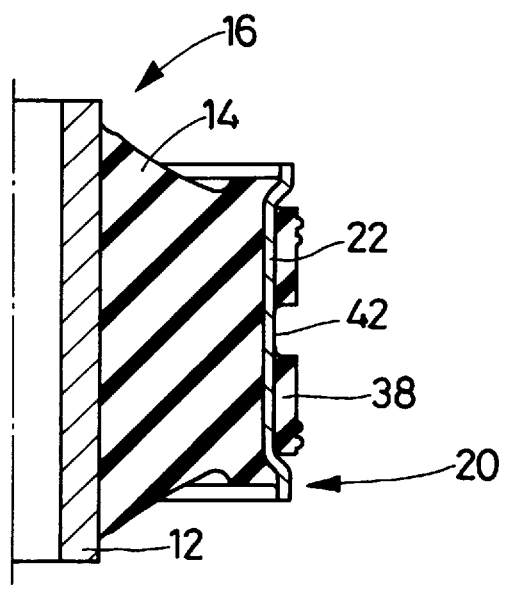
FIG. 8 is a cross sectional view taken along line 8—8 of FIG. 4.

As shown in FIGS. 4, 5, 7 and 8, the two sealing rubber layers 38 define therebetween two arcuate grooves 42, 42 in an axially central portion of the intermediate sleeve 20. The arcuate grooves 42, 42 are U-shaped in cross section as seen in FIG. 8, and extend in the circumferential direction of the intermediate sleeve 20, between the first and second windows 24, 26. As indicated in FIG. 4, one of the grooves 42 extends between one of the opposite circumferential ends of the first window 24 and one of the opposite circumferential ends of the second window 26, while the other groove 42 extends between the other circumferential ends of the first and second windows 24, 26.

As shown in FIGS. 4, 5 and 7, the core portion 16 has two rectangular planar sealing members 44 formed integrally with the sealing rubber layers 38 such that the planar sealing members 44 extend radially outwards from the outer circumferential surfaces of the sealing rubber layers 38. The two planar sealing members 44 are opposed to each other in a diametric direction of the core portion 16 perpendicular to the load-receiving direction in which the first and second pockets 28, 30 are opposed to each other diametrically of the elastic body 14. Each of the planar sealing members 44 extends in the axial direction of the intermediate sleeve 20, over a substantially entire axial length of the recess 22, as indicated in FIG. 7, so that the two sealing members 44 bridge the respective two U-shaped arcuate grooves 42, 42, as shown in FIGS. 5 and 7.

Figure 9:
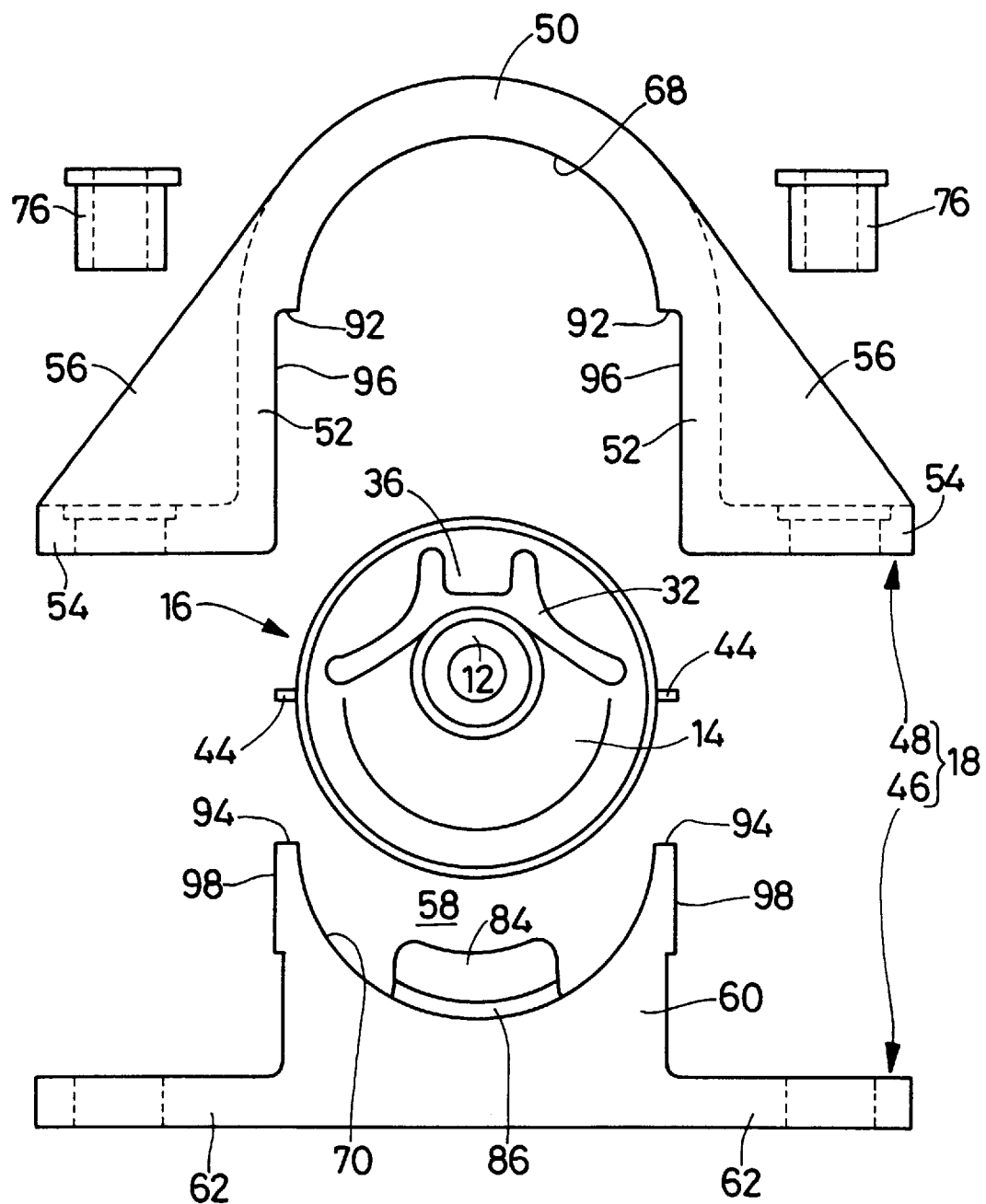
FIG. 9 is an exploded view of the engine mount of FIG. 1.

The outer sleeve assembly 18 consists of a plurality of sections having respective part-cylindrical inner surfaces, more specifically, a first member 46 and a second member 48 which have semi-cylindrical inner surfaces 70, 68, respectively, as most clearly shown in FIG. 9. The first and second members 46, 48 are both formed of a thermoplastic resin material. The first member 46 includes a body portion 60 and two fixing plate portions 62, 62 formed integrally with the body portion 60. The body portion 60 is a substantially rectangular block with a semi-cylindrical groove 58 formed in its upper surface. The fixing plate portions 62, 62 extend from the lower end portions of the opposite side surfaces of the body portion 60 in the opposite directions and which are integral with the body portion 60. The second member 48 includes a semi-cylindrical portion 50, two tangential plate portions 52, 52 formed integrally with the semi-cylindrical portion 50, and two fixing plate portions 54, 54 formed integrally with the tangential plate portions 52. The two tangential plate portions 52, 52 extend from the respective circumferential ends of the semi-cylindrical portion 50 in the same direction. The two fixing plate portions 54, 54 extend from the lower ends of the respective tangential plate portions 52, 52 in the opposite directions away from each other. The tangential plate portions 52, 52 are perpendicular to the fixing plate portions 54, 54. Thus, the second member 48 is generally Q-shaped in front elevation as seen in FIG. 9. At the axially opposite end portions of the second member 48, there are formed two pairs of reinforcing ribs 56, 56 bridging the tangential and fixing plate portions 52, 54. The ribs 56 are integral with the portions 50, 52, 54.

When the core portion 16 and the outer sleeve assembly 18 are assembled into the cylindrical engine mount 10, the first and second members 46, 48 are superposed on each other such that the fixing plate portions 54 of the second member 48 are placed on the upper surfaces of the fixing plate portions 62 of the first member 46. The fixing plate portions 62, 54 are fixed together by welding at selected fixing portions or points 64, namely, four fixing points 64 in the present embodiment, as indicated in FIG. 1. For instance, the welding is effected by spot welding, for example, by direct ultrasonic welding by holding a ultrasonic horn in pressing contact with the selected fixing portions 64 of the fixing plate portions 62, 54. The thermoplastic resin material of the fixing plate portions 52, 54 is softened and fused by ultrasonic vibrations.

With the first and second members 46, 48 thus welded together, the semi-cylindrical inner surface 70 of the semi-cylindrical groove 58 of the first member 46 and the semi-cylindrical inner surface 68 of the semi-cylindrical portion 50 of the second member 48 cooperate to define the cylindrical bore 19, and the superposed and welded fixing plate portions 62, 54 of the first and second members 46, 48 provide two attaching portions 72 each having a relatively large thickness. Each of the attaching portion 72 has a hole 74 formed through its thickness, and an attaching metal sleeve 76 is fixedly received in the hole 74. The outer sleeve assembly 18 is attached to the vehicle body such that suitable bolts or the like fixed to the vehicle body are inserted through the attaching metal sleeves 76. Thus, the outer sleeve assembly 18 includes an integrally formed bracket in the form of the planar attaching portions 72 for attaching the outer sleeve assembly 18 (engine mount 10) to the vehicle body. When the attaching metal sleeves 76 are fixed in the holes 74, the sleeves 76 are heated by induction heating, and then inserted into the holes 74.

The assembling of the outer sleeve assembly 18 by welding of the first and second members 46, 48 is conducted such that the core portion 16 is sandwiched by and between the first and second members 46, 48, as indicated in FIG. 9. Simultaneously with the assembling of the outer sleeve assembly 18, the the core portion 16 and the outer sleeve assembly 18 are assembled such that the core portion 16 is fixedly received within the cylindrical bore 19 defined by the semi-cylindrical inner surfaces 70, 68 of the first and second members 46, 48, as indicated in FIGS. 1–3. With the outer sleeve assembly 18 mounted on the core portion 16, the first and second pockets 28, 30 and the U-shaped arcuate grooves 42 which are open in the outer circumferential surface of the core portion 16 are closed by the outer sleeve assembly 18, whereby the thus obtained engine mount 10 is filled with a non-compressible fluid. That is, the first pocket 28 and the first member 46 cooperate to define a pressure-receiving chamber 78, while the second pocket 30 and the second member 48 cooperate to define an equilibrium chamber 80. Further, the two U-shaped arcuate grooves 42, 42 cooperate with the first and second members 46, 48 to define two orifice passages 82, 82 which communicate with the pressure-receiving and equilibrium chambers 78, 80. The pressure-receiving chamber 80 is partially defined by the elastic body 14, so that the pressure of the non-compressible fluid in the pressure-receiving chamber 80 changes due to elastic deformation of the elastic body 14 upon application of a vibrational load to the engine mount 10. On the other hand, the equilibrium chamber 80 is partially defined by the bottom wall 34 (of the second pocket 30), so that the elastic deformation of the bottom wall 34 permits a change of the volume of the equilibrium chamber 80.

In the present embodiment, the welding of the first and second members 46, 48 of the outer sleeve assembly 18 and the assembling of the core portion 16 and the outer sleeve assembly 18 are effected within a mass of the non-compressible fluid, so that the pressure-receiving and equilibrium chambers 78, 80 are filled with the fluid. For the present engine mount 10 to exhibit an excellent damping effect based on resonance of the fluid, it is desirable to select the non-compressible fluid from among water, alkylene glycol, polyalkylene glycol and silicone oil, preferably, such fluids having a viscosity of not higher than 0.1 Pa·s.

Upon application of the vibrational load between the inner sleeve 12 and the outer sleeve assembly 18 and consequent elastic deformation of the elastic body 14, there arise pressure changes of the fluid in the pressure-receiving and equilibrium chambers 78, 80, which cause the fluid to flow between these two chambers 78, 80 through the orifice passages 82, 82. The engine mount 10 exhibits a damping effect with respect to the input vibrations in a desired frequency range, on the basis of the resonance of the fluid flowing through the orifice passages 82, 82. In the present embodiment, the length and cross sectional area of the orifice passages 82 are tuned so that the engine mount 10 exhibits a high damping effect with respect to low-frequency vibrations such as engine shakes, on the basis of the resonance of the fluid flowing through the orifice passages 82.

The first member 46 of the outer sleeve assembly 18 is provided with an inward projection 84 integrally formed in an circumferentially intermediate portion of the semi-cylindrical surface 70 of the semi-cylindrical groove 58. This inward projection 84 has a generally rectangular block, which has two arcuate grooves 86 formed at its bottom portion. Described more specifically, the two arcuate grooves 86 are formed along the semi-cylindrical inner surface 70, as indicated in FIG. 9, in the respective opposite side surfaces of the inward projection 84 which are opposed to each other in the axial direction of the outer sleeve assembly 18, as indicated in FIG. 2. These arcuate grooves 86 provide an arcuate constructed portion of the inward projection 84. With the first and second members 46, 48 being assembled on the core portion 16, the inward projection 84 protrudes radially inwardly of the core portion 16, into the pressure-receiving chamber 78. The inward projection 84 cooperates with the inner surface of the chamber 78 to define a restricted fluid passage 88 in a closed-loop around the side surfaces of the inward projection 84. In the pressure-receiving chamber 78, the restricted fluid passage 88 permits flows of the fluid therethrough upon application of vibrations in a selected frequency range. That is, the restricted fluid passage 88 is dimensioned or tuned so that the engine mount exhibits a low dynamic spring constant with respect to high-frequency vibrations such as booming noises of the vehicle, on the basis of the fluid flows through the restricted fluid passage 88.

With the first and second members 46, 48 welded together so as to enclose the core portion 16, the sealing rubber layers 38 are squeezed by and between the outer circumferential surface of the intermediate sleeve 20 of the core portion 16 and the inner circumferential surface of the bore 19 of the outer sleeve assembly 18, whereby fluid tightness is provided between the core portion 16 and the cylindrical bore 19.

The first member 46 has a pair of abutting surfaces in the form of end faces 94 which extend along the opposite edges of the semi-cylindrical groove 58 of the body portion 60, in the axial direction of the outer sleeve assembly 18. The end faces 94 are contiguous to the semi-cylindrical inner surface 70. In other words, the parallel end faces 94 are formed by forming the semi-cylindrical groove 58 of FIGS. 2, 4 and 9 in the upper surface of the body portion 60, such that the diameter of the groove 58 (the largest dimension as measured in the horizontal direction of FIG. 9) is smaller than the corresponding width of the body portion 60. The second member 48 also has a pair of abutting surfaces in the form of shoulder surfaces 92 at the ends of the semi-cylindrical inner surface 68. Like the end faces 94, the shoulder surfaces 92 extend in the axial direction of the outer sleeve assembly 18 and are contiguous to the semi-cylindrical inner surface 68. The end faces 94 and the shoulder surfaces 92 have substantially the same dimension in the radial direction of the cylindrical bore 19. The first and second members 46, 48 are butted together at the end faces 94, 94 and the shoulder surfaces 92, 92, such that the planar sealing members 44 protruding radially outwards from the core portion 16 are squeezed by and between the end faces 94 and the corresponding shoulder surfaces 92. Thus, the core portion 16 is sealed with respect to the cylindrical bore 19 of the outer sleeve assembly 18, at the abutting surfaces 94, 92 of the first and second members 46, 48 of the outer sleeve assembly 18.

The first member 46 of the outer sleeve assembly 18 further has a pair of abutting surfaces in the form of outer side surfaces 98 of the body portion 60, while the second member 48 further has a pair of abutting surfaces in the form of inner surfaces 96 of the tangential plate portions 52. When the first and second members 46, 48 are assembled into the outer sleeve assembly 18, these outer side surfaces 98 and the inner surfaces 96 are also held in contact with each other. As is apparent from FIGS. 1 and 9, the surfaces 98, 96 are substantially perpendicular to the end faces 94 and the shoulder surfaces 92. Thus, the first and second members 46, 48 of the outer sleeve assembly 18 have respective two first pairs of abutting surfaces 92, 94 and respective two second pairs of abutting surfaces 96, 98, and the two first pairs of abutting surfaces 92, 94 provide two pairs of abutting surfaces which are contiguous to the semi-cylindrical inner surfaces 68, 70. The abutting surfaces 92, 94 of each of the two first pairs extend from the cylindrical surface of the cylindrical bore 19 in a first diametric direction of the bore 19 (horizontal direction as seen in FIGS. 1 and 9), while the abutting surfaces 96, 98 of each of the two second pairs respectively extend in a direction (load-receiving direction, or vertical direction as seen FIGS. 1 and 9) parallel to a second diametric direction of the cylindrical bore 19 which is substantially perpendicular to the first diametric direction. The first and second members 46, 48 are butted together at the two first pairs of abutting surfaces 92, 94 in the above-indicated second diametric direction, and at the two second pairs of abutting surfaces 96, 98 in the above-indicated first diametric direction. With the first and second members 46, 48 butted together at the abutting surfaces 92, 94, 96, 98, the first and second members 46, 48 are protected from relative displacement and consequent deformation of the cylindrical bore 19. Accordingly, the fluid tightness between the core portion 16 and the cylindrical bore 19 is maintained with high stability.

As indicated in FIG. 9, the outer side surfaces 98 of the body portion 60 of the first member 46 are slightly recessed at their lower portions, as shown in FIG. 9, whereby there are left gaps 100 between the lower recessed portions of the outer side surfaces 98 and the corresponding lower portions of the inner surfaces 96 of the tangential plate portions 52 of the second member 48, as shown in FIG. 1, when the first and second members 46, 48 are assembled. The gaps 100 provided over a suitable length facilitate the assembling of the first and second members 46, 48, while the surfaces 96, 98 have a contact area enough to assure required accuracy of relative positioning of these members 46, 48.

In the present engine mount 10 constructed as described above, the assembling of the outer sleeve assembly 18 and the assembling of the core portion 16 and the outer sleeve assembly to form the engine mount 10 can be effected simultaneously by assembling the first and second members 46, 48 on the outer circumferential surface of the core portion 16, and by welding the first and second members 46, 48 together at the selected welding or fixing portions 64. Therefore, the present engine mount does not require an operation to press-fit the core portion 16 within the outer sleeve assembly 18, and eliminates a cumbersome operation for drawing the outer sleeve assembly 18 onto the core portion 16, and an expensive device for such drawing operation, whereby the production efficiency and cost of the engine mount 10 are remarkably improved and lowered, respectively. Since the first and second members 46, 48 are assembled on the core portion 16 by moving the two members 46, 48 toward each other in the radially inward direction, the inward projection 84 provided integrally with the first member 46 to provide the restricted fluid passage 88 does not disturb the assembling of the engine mount 10. Thus, the restricted fluid passage 88 is formed by simply assembling the first and second members 46, 48 on the core portion 16, namely, without a member exclusively used for forming the fluid passage 88. Accordingly, the overall function of the engine mount 10 can be enhanced with a relatively small number of components, and without complicating the structure or increasing the cost of manufacture of the mount.

Further, the sealing members 44 interposed and squeezed between the abutting surfaces 94, 92 of the first and second members 46, 48 assure sufficient fluid tightness at the interface of the first and second members 46, 48 with high stability. In addition, the fixing portions of the first and second members 46, 48 are spaced apart from the sealing members 44, so that the sealing members 44 are not adversely influenced by heat generated during the welding operation to fix the first and second members together, for example. This arrangement assures the fluid tightness of the engine mount 10 with increased stability. In particular, the sealing members 44 and the sealing rubber layers 38 are effectively protected from heat transferred from the fixing portions 64, since the fixing portions 64 are distant from the cylindrical bore 19 by a sufficiently long distance, and the spot welding is employed at the fixing portions 64.

In the present embodiment in which the sealing members 44 are formed integrally with the core portion 16, the core portion 16 and the first and second members 46, 46 of the outer sleeve assembly 18 can be easily assembled, without misalignment of the sealing members 44 with respect to the abutting surfaces 94, 92 of the first and second members 46, 48, whereby the sealing members 44 provide the desired fluid tightness with high stability.

Further, the provision of the first pairs of abutting surfaces 94, 92 and the second pairs of abutting surfaces 98, 96 on the first and second members 46, 48 assures significantly increased stability of fluid tightness at the interface between the core portion 16 and the bore 19 of the outer sleeve assembly 18. Described in detail, the first pair of abutting surfaces 94, 94, of the first member 46 extending in the first diametric direction of the cylindrical bore 19 are held in abutting contact with the first pair of abutting surfaces 92, 92 of the second member also extending in the first diametric direction, while the second pair of abutting surfaces 98, 98 of the first member 46 extending in the second diametric direction of the bore 19 perpendicular to the first diametric direction are held in abutting contact with the second pair of abutting surfaces 96, 96 of the second member 48 also extending in the second diametric direction. This arrangement is effective to prevent relative displacement of the first and second members 46, 48 and consequent deformation of the cylindrical bore 19, upon application of vibrational loads between the inner sleeve 12 and the outer sleeve assembly 18 in various radial directions of the mount 10.

In the present engine mount 10, the fixing plate portions 54 of the second member 48 are fixedly superposed on the fixing plate portions 62 of the first member 46. When the engine mount 10 is installed on the vehicle body, the engine mount 10 is positioned such that the first member 46 is in contact with a mounting surface of the vehicle body, and the second member 48 is attached to the vehicle body via the first member 46, by inserting suitable bolts through the attaching sleeves 74. Since the fixing plate portions 54 are held in contact with the fixing plate portions 62, a vibrational load will not act directly on the abutting surfaces 94, 92 of the first and second members 46, 48 during use of the engine mount 10 on the vehicle, whereby the durability of the engine mount 10 at the interface of the first and second members 46, 48 is improved. In this respect, it will be understood that the fixing portions 64 do not require a large welding strength, provided that the planar sealing members 44 are squeezed by and between the abutting surfaces 92, 94 by a suitable force so as to assure the intended fluid tightness, and that the first and second members 46, 48 can be welded together prior to the installation of the engine mount 10. Accordingly, the welding operation is simplified.

The present engine mount 10 is further advantageous in that the outer sleeve assembly 18 consists of an outer sleeve (50, 52, 60), and a bracket in the form of the fixing plate portions 62, 54 formed integrally with the outer sleeve. This arrangement is effective to reduce the numbers of the components and the production process steps and the production cost of the engine mount 10 and the bracket required to attach the outer sleeve to the vehicle body.

There will be described an engine mount according to a second embodiment of the present invention, by reference to FIG. 10, wherein the same reference numerals as used in FIG. 9 are used to identify the corresponding components or elements.

Figure 10:
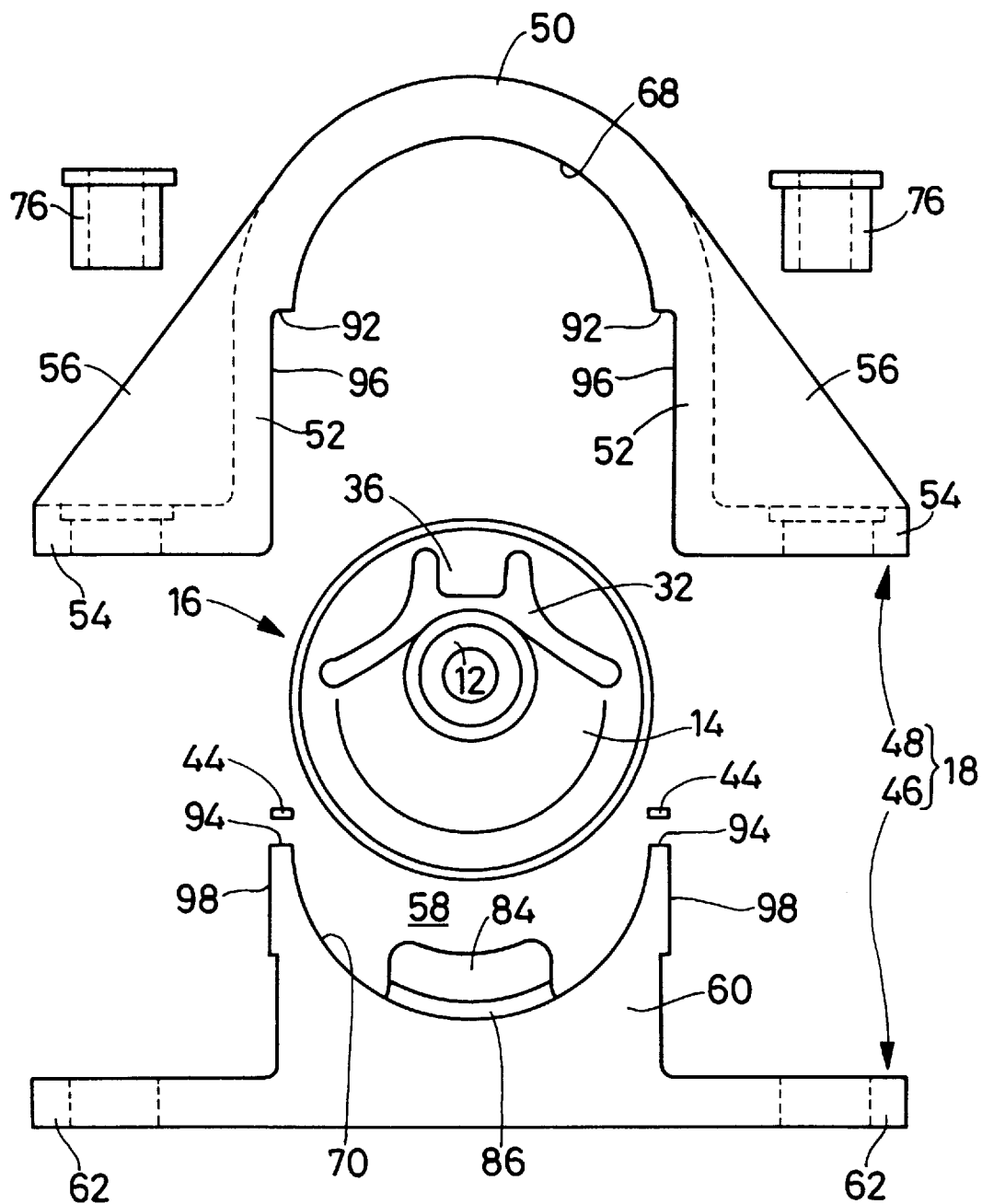
FIG. 10 is an exploded view corresponding to that of FIG. 9, showing an engine mount constructed according to another embodiment of this invention.

In the engine mount of FIG. 10, the rectangular planar sealing members 44, 44 are not formed integrally with the core portion 16, but are provided as separate members. Upon assembling the first and second members 46, 48 on the core portion 16, the sealing members 44 are interposed and squeezed between the end faces 94, 94 of the first member 46 and the shoulder surfaces 92, 92 of the second member 48, as in the first embodiment. The separate sealing members 44, 44 used in the present second embodiment have the same shape and size as the sealing members 44 integral with the core portion 16 in the first embodiment. The sealing members 44 are elastically deformed under pressure between the end faces 94 and the shoulder surfaces 92, the sealing members 44 are forced into fluid-tight contact with the outer circumferential surface of the core portion 16, more specifically, onto the sealing rubber layers 38 formed in the annular recess 22 of the intermediate sleeve 20.

The engine mount constructed according to the second embodiment has substantially the same advantages as the engine mount of the first embodiment.

Figure 11:
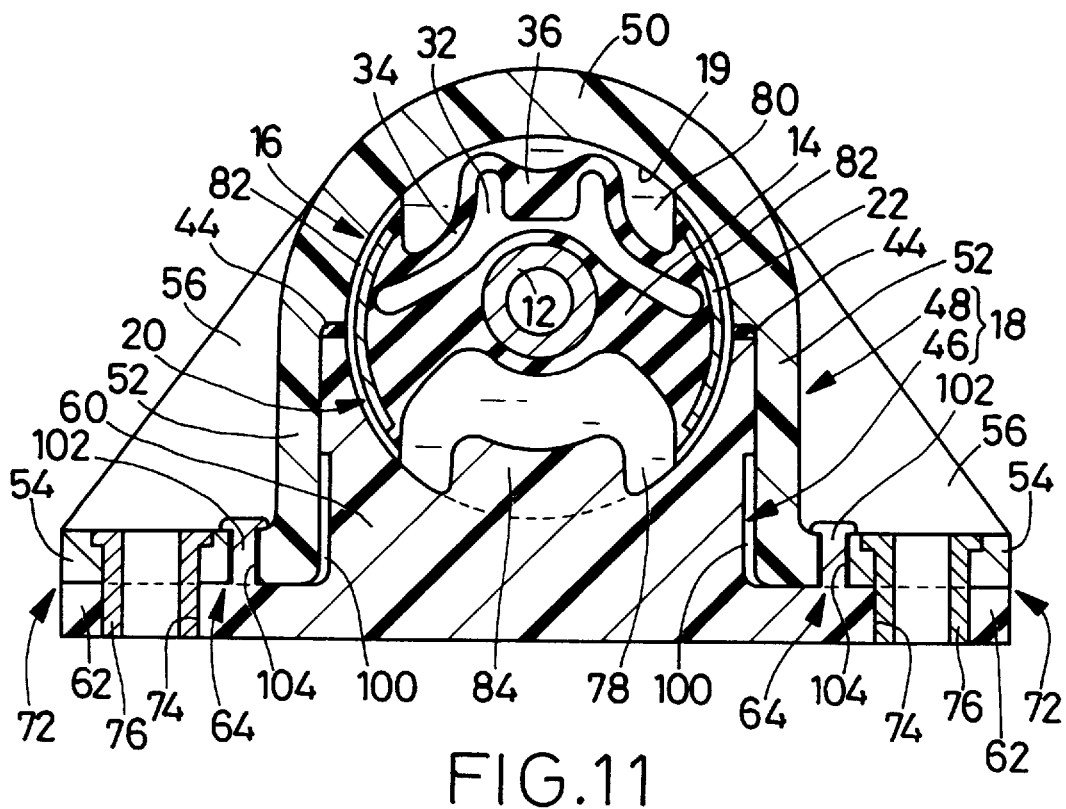
FIG. 11 is an elevational view in transverse cross section of an engine mount according to a further embodiment of this invention.

Referring next to the transverse cross sectional view of FIG. 11 corresponding to that of FIG. 1, an engine mount according to a third embodiment of this invention is shown. In FIG. 11, the same reference numerals as used in FIG. 1 are used to identify the same components or elements.

Figure 12:
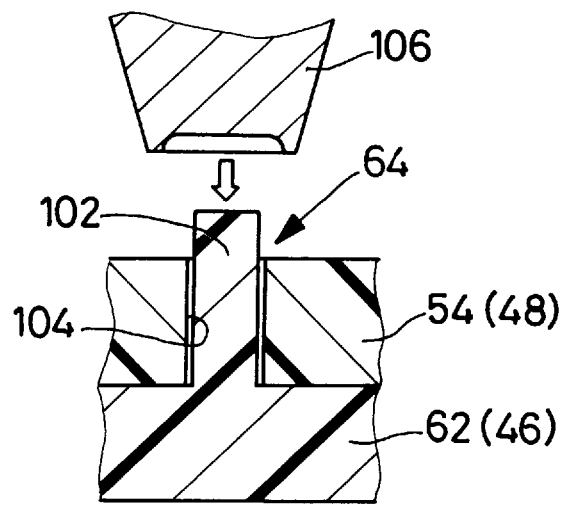
FIG. 12 is a view for explaining a process of manufacturing the engine mount of FIG. 11.

In the engine mount of FIG. 11, the first and second members 46, 48 are fixed to each other by riveting. Described in detail, the fixing plate portions 62 of the first member 46 have integrally formed bosses 102 at the fixing portions 64, respectively. On the other hand, the fixing plate portions 54 of the second member 48 have through-holes 104 formed through the thickness, so that the bosses 102 extend through the respective through-holes 104 and project above the upper surface of the fixing plate portions 54 when the fixing plate portions 54 are placed on the fixing plate portions 62 upon assembling of the first and second members 46, 48 into the outer sleeve assembly 18. Then, a suitable tool 106 is pressed onto the end portion of each boss 102, as indicated in FIG. 12, for forming a head at the end of the boss 102, as indicated in FIG. 11. Thus, the first and second members 46, 48 are fixed together by riveting.

In the present third embodiment, the first member 46 is formed of a thermoplastic resin material. However, the material of the second member 48 is not limited the thermoplastic resin material, but may be suitably selected from among various materials including thermosetting resin materials and various metals such as aluminum alloys. Thus, the second member 48 has a comparatively high degree of freedom in the selection of its material depending upon the desired characteristics of the engine mount. The bosses 104 may be replaced by thermoplastic resin rivets formed separately from the first member 46. In this case, the thermoplastic resin rivets are inserted into the through-holes 104 in the fixing plate portions 54 of the second member 48, and subjected to a suitable welding operation so that the rivets are bonded to the fixing plate portions 62 of the first member 46, as well as to the fixing portions 54 of the second member 48.

Figure 13:
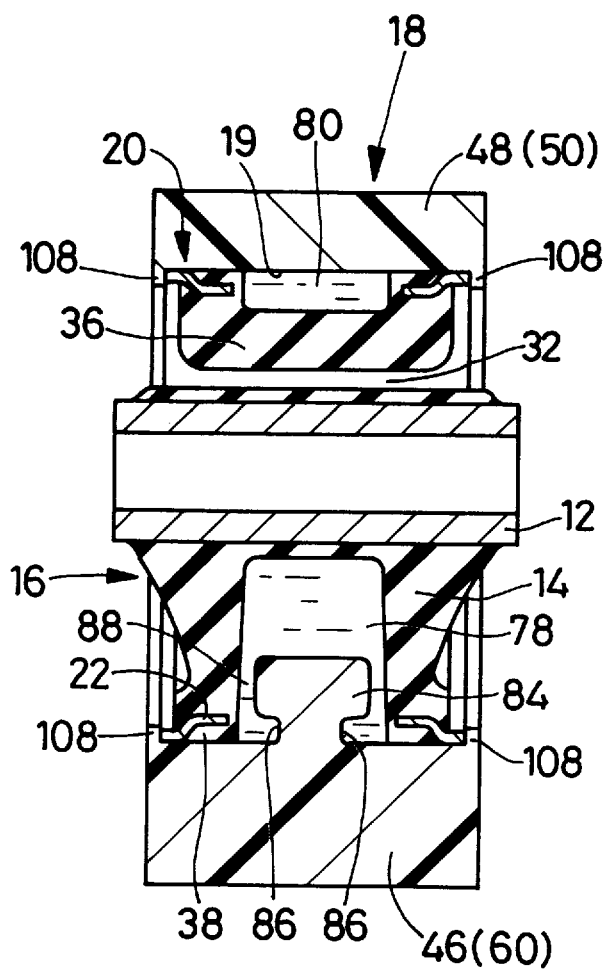
FIG. 13 is an elevational view in longitudinal cross section of an engine mount according to a still further embodiment of this invention.

Referring then to the longitudinal cross sectional view of FIG. 13 corresponding to that of FIG. 2, there will be described an engine mount according to a fourth embodiment of this invention. In FIG. 13, the same reference numerals as used in the first embodiment are used to identify the corresponding components or elements.

In the engine mount of FIG. 13, the first member 46 of the outer sleeve assembly 18 has a pair of arcuate engaging projections 108 formed integrally with the body portion 60 such that the two arcuate engaging projections 108 are located at the opposite axial ends of the semi-cylindrical groove 58 and extend along the semi-cylindrical inner surface 70, with a suitable amount of radially inward projection from the inner surface 70. Similarly, the second member 48 has a pair of arcuate engaging projections 108 formed integrally with the semi-cylindrical portion 50 such that the two arcuate engaging projections 108 are located at the opposite axial ends of the semi-cylindrical portion 50 and extend along the semi-cylindrical inner surface 68, with the same amount of radially inward projection from the inner surface 68 as the projections 108 of the first member 46. When the first and second members 46, 48 are assembled, the engaging projections 108 are located at the opposite axial ends of the cylindrical bore 19 and at the opposite axial ends of the core portion 19, and are held in abutting contact with the opposite axial end faces of the intermediate sleeve 20.

In the present engine mount, the engaging projections 108 engaging the axial end faces of the intermediate sleeve 20 are effective to prevent axial displacement of the core portion 16 relative to the outer sleeve assembly 18 (within the cylindrical bore 19), and increase a resistance of the engine mount to a load applied thereto in the axial direction. Further, the provision of the engaging projections 108 integral with the first and second members 46, 48 does not disturb the assembling of the first and second members 46, 48, since the first and second members 46, 48 are moved relative to each other in the radially inward direction upon assembling of these members 46, 48 on the core portion 16. In other words, the engaging projections 108 provide a simple mechanism for preventing the relative axial displacement of the core portion 16 and the outer sleeve assembly 18, without increasing the number of the components and the cost of manufacture of the engine mount 10.

Figure 14:
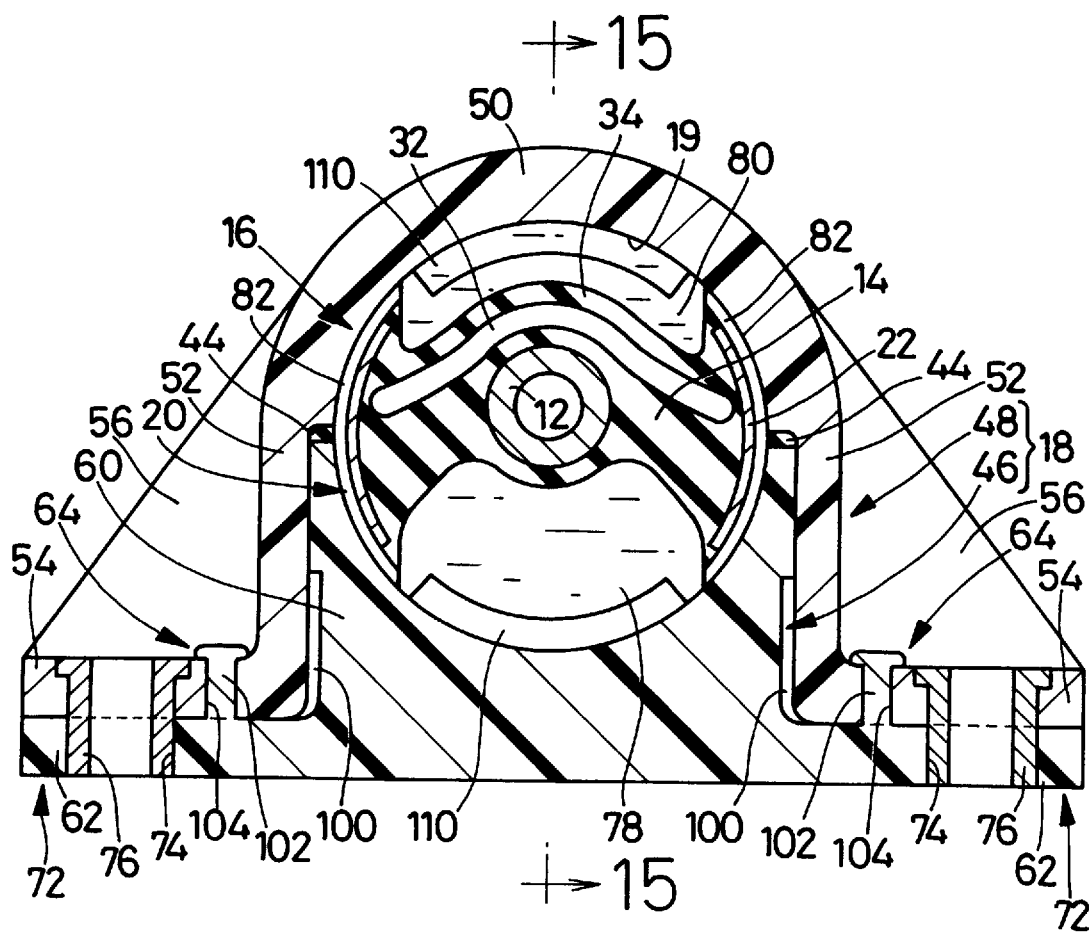
FIG. 14 is an elevational view in transverse cross section of an engine mount according to a yet further embodiment of this invention.
Figure 15:
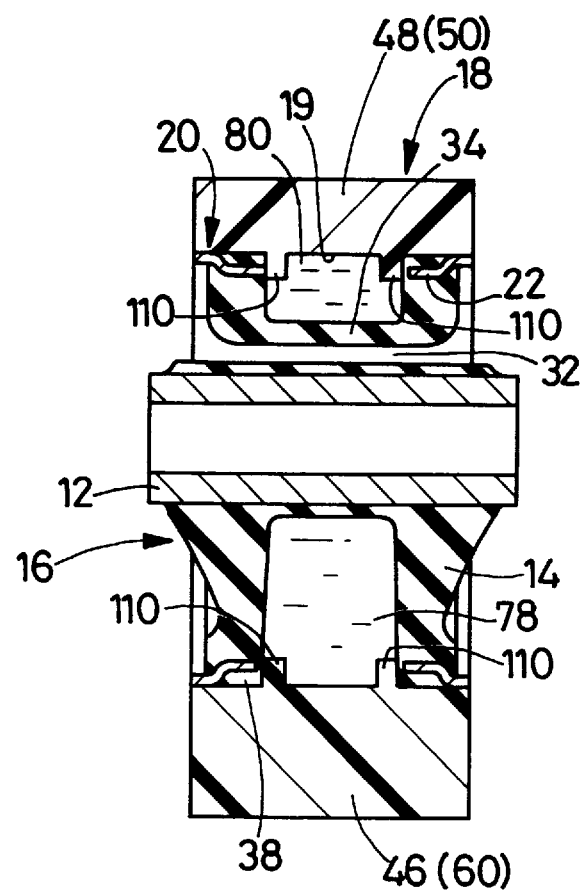
FIG. 15 is a cross sectional view taken along line 15—15 of FIG. 14.
Figure 16:
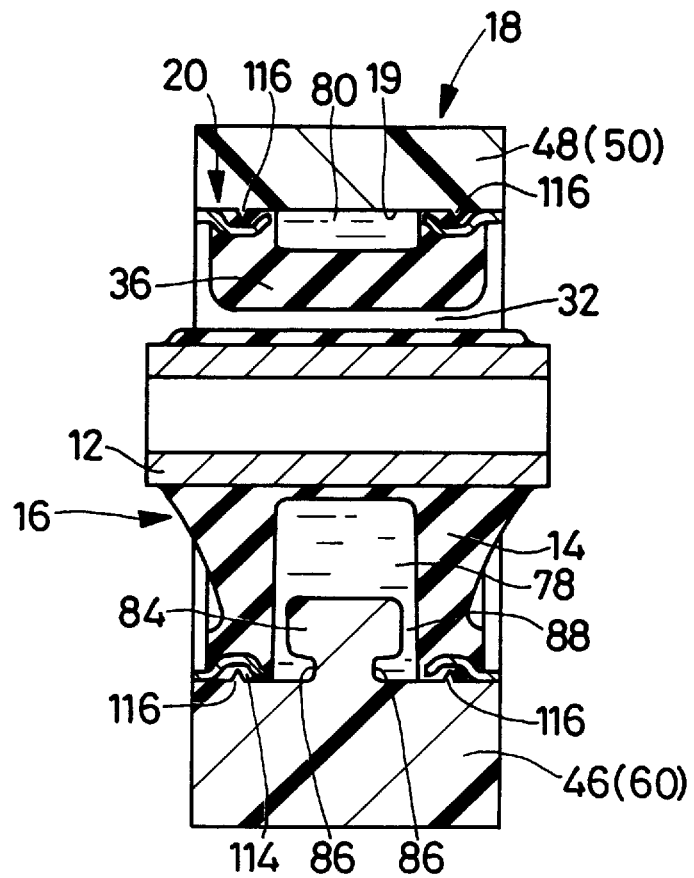
FIG. 16 is an elevational view in longitudinal cross section of an engine mount according to still another embodiment of this invention.
Figure 17:
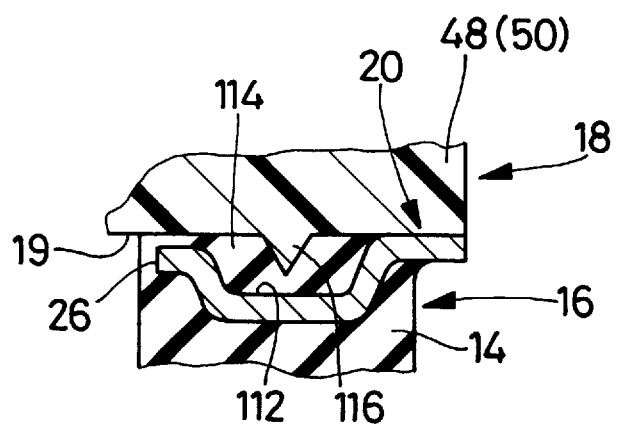
FIG. 17 is an enlarged fragmentary view for explaining a part of the engine mount of FIG. 16.

The engaging projections 108 for preventing the relative axial displacement of the core portion 16 and the outer sleeve assembly 18 may be replaced by other forms of engaging projections as illustrated in FIGS. 14–15 and in FIGS. 16–17.

In a fifth embodiment of FIGS. 14–15, the first member 46 of the outer sleeve assembly 18 has a pair of arcuate engaging projections 110 formed integrally with the body portion 60 such that the two arcuate engaging projections 110 protrude from the semi-cylindrical inner surface 70 into the pressure-receiving chamber 78 (first pocket 28) in the radially inward direction and extend along the semi-cylindrical inner surface 70, with a suitable amount of radially inward projection from the inner surface 70. Thus, the two arcuate engaging projections 110 are located at axially intermediate portions of the semi-cylindrical groove 58. Similarly, the second member 48 has a pair of arcuate engaging projections 110 formed integrally with the semi-cylindrical portion 50 such that the two arcuate engaging projections 110 protrude from the semi-cylindrical inner surface 68 into the equilibrium chamber 80 (second pocket 30) in the radially inward direction and extend along the semi-cylindrical inner surface 68, with the same amount of radially inward projection from the inner surface 68 as the projections 110 of the first member 46. When the first and second members 46, 48 are assembled, the engaging projections 110 are held in abutting contact with the opposite edges of the intermediate sleeve 20 which define the opposite axial ends of the first and second windows 24, 26.

In the present fifth embodiment of FIGS. 14–15 wherein the engaging projections 110 protrude into the fluid chambers 78, 80 to prevent the axial relative displacement of the core portion 16 and the outer sleeve assembly 18, the axial length of the outer sleeve assembly 18 can be made smaller than that of the outer sleeve assembly 18 in the fourth embodiment of FIG. 13 in which the engaging projections 108 are provided at the opposite axial ends of the first and second members 46, 48. Further, the fluid tightness of the fluid chambers 78, 80 with respect to the semi-cylindrical inner surfaces 68, 70 can be improved by the engaging projections 110 which engage the intermediate sleeve 20 in the axial direction via thin rubber layers of the elastic body 14 which cover the edge portions of the first and second windows 24, 26 of the intermediate sleeve 20.

In a sixth embodiment of FIGS. 16–17, the intermediate sleeve 20 has two annular recesses 112 near the opposite axial end portions. These annular recesses 112 are filled with respective axial sealing layers in the form of sealing rubber layers 114. Each of the first and second members 46, 48 of the outer sleeve assembly 18 has an annular engaging projection 116 which protrudes from the semi-cylindrical inner surface 70, 68. The annular engaging projection 116 has a suitable height and has a triangular shape in cross section as indicated in FIG. 17. When the first and second members 46, 48 are assembled on the core portion 16, the annular engaging projections 116 protruding radially inwardly from the first and second members 46, 4a are forced into the sealing rubber layers 114 in the annular recesses 112, as shown in FIG. 17. Thus, each engaging projection 116 is located adjacent to the opposite side surfaces of the corresponding annular recess 112 of the intermediate sleeve 20 in the axial direction of the intermediate sleeve 20, and is held in abutting contact with these opposite side surfaces of the sleeve 20 via the sealing rubber layer 114.

In the embodiment of FIGS. 16–17, the annular recesses 112, sealing rubber layers 114 and engaging projections 116 constitute a mechanism for preventing the axial relative displacement of the core portion 16 and the outer sleeve assembly 18. This mechanism does not require an increase in the axial length of the outer sleeve assembly 18. In addition, the abutting contact of the engaging projections 116 with the intermediate sleeve 20 via the sealing rubber layers 114 is effective to improve the fluid tightness of the engine mount.

While the various preferred embodiments of the present invention have been described above for illustrative purpose only, it is to be understood that the invention is not limited to the details of the illustrated embodiments.

Figure 18:
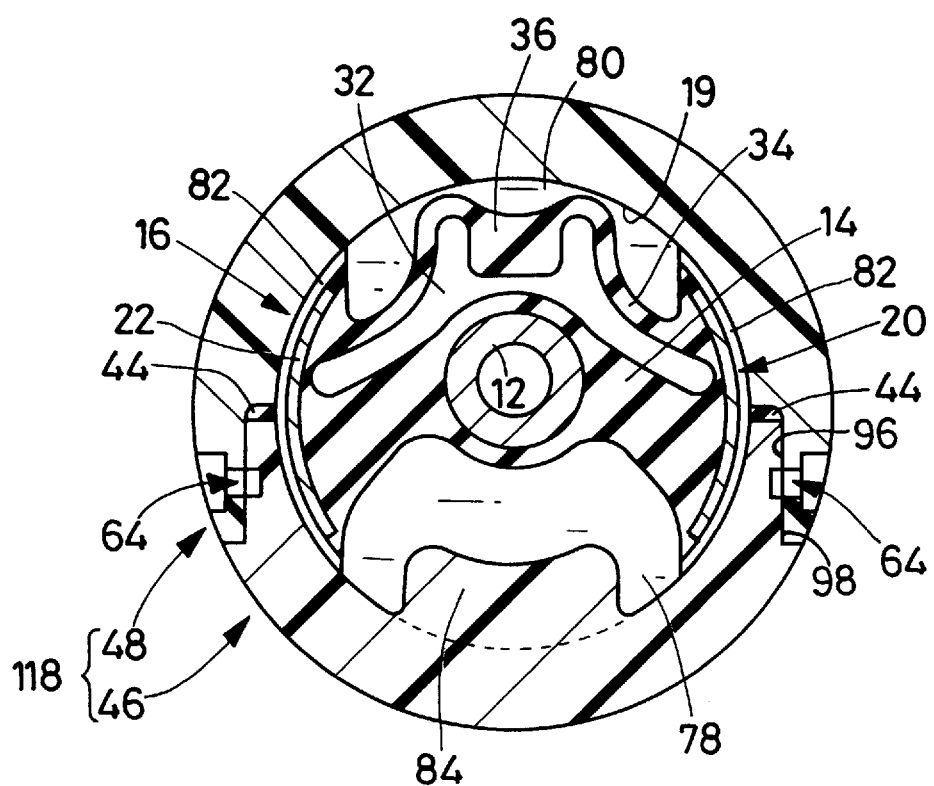
FIG. 18 is an elevational view in transverse cross section of an engine mount according to yet another embodiment of this invention.

For instance, the outer sleeve portion in the form of the outer sleeve assembly 18 which includes the integrally formed bracket portion 54, 62 may be replaced by an outer sleeve 118 as shown in FIG. 18, which does not include an integrally formed bracket portion.

In the illustrated embodiments, the outer sleeve portion 18, 118 consists of two sections in the form of the first and second members 46, 48. However, the outer sleeve portion which cooperates with the core portion 16 to constitute a fluid-filled elastic cylindrical mount according to the present invention may consist of three or more sections having respective part-cylindrical inner surfaces which cooperate to define a cylindrical bore in which the core portion 16 is fixedly received. The outer sleeve portion may have a desired configuration or shape. Where the core portion has a rectangular or other polygonal shape in transverse cross section, for example, the bore of the outer sleeve portion may have the similar cross sectional shape.

It is also noted that all of the constituent sections of the outer sleeve portion may be made of metallic materials.

The constituent sections of the outer sleeve portion may be fixed together by suitable means, techniques or methods other than spot welding by direct ultrasonic welding as in the illustrated embodiments, such as indirect ultrasonic welding and other welding techniques, various mechanical fastening methods such as riveting and calking, and various bonding methods using various bonding adhesives. In this respect, however, it is desirable to fix the constituent sections together so that a load will not act on the abutting surfaces (92, 94) which are contiguous to the inner surface of the bore (19) in which the core portion 16 is fixed received. This arrangement is desirable to permit the use of simple means for fixing the sections together to form the outer sleeve portion. In the illustrated embodiments except the embodiment of FIG. 18, the fixing plate portions 54 of the second member 48 are superposed on the fixing plate portions 62 of the first member 46 so that a load will not act on the abutting surfaces 92, 94.

The length of the sealing members 44 need not be equal to the entire axial length of the cylindrical bore 19. For example, each sealing member 44 may be replaced by two sealing members disposed at the respective axial end portions of the bore 19. In this case, the sealing members provide some sealing effect at the abutting surfaces 92, 94.

In the illustrated embodiments, the inward projection 84 is provided as means for defining the restricted fluid passage 88. However, the fluid-filled elastic mount according to the invention may be provided with an inward projection or projections having other functions. For instance, an inward projection having a suitable radial height may be provided so as to extend from the outer sleeve assembly 18 or portion 118 toward the inner sleeve 12, as a stopper for limiting the relative radial displacement of the inner sleeve 12 and the outer sleeve assembly 18 or portion 118. Alternatively, an inward projection or projections may be provided so as to be located within the elastic body 14, as means for restricting the elastic deformation of the elastic body 14, or as a rib or ribs for reinforcing the outer sleeve assembly or portion. Such inward projections need not protrude into the fluid chamber or chambers, but may be provided in a void or space between the inner sleeve 12 and the outer sleeve assembly 18 or portion 118, or formed within the elastic body 14.

The fixing portions at which the sections of the outer sleeve portion are fixed to each other are not limited to the fixing portions 64, provided the fixing portions should be spaced apart from the sealing members. The positions of the fixing portions may be suitably selected on the constituent sections of the outer sleeve assembly 18 or portion 118, depending upon the specific configuration of those sections and the direction or directions in which the vibrational loads are applied to the elastic mount. In the seventh embodiment of FIG. 18 using the outer sleeve 118, the fixing portions 64 are located at the outer and inner abutting surfaces 98, 96 of the first and second members 46, 48.

The configurations of the abutting surfaces of the constituent sections of the outer sleeve portion are not limited to the details in the illustrated embodiments in which the first pairs of abutting surfaces 92, 94 extend in a first diametric direction of the cylindrical bore 19, while the second pairs of abutting surfaces 96, 98 extend in a direction parallel to a second diametric direction perpendicular to the first diametric direction.

Figure 19:
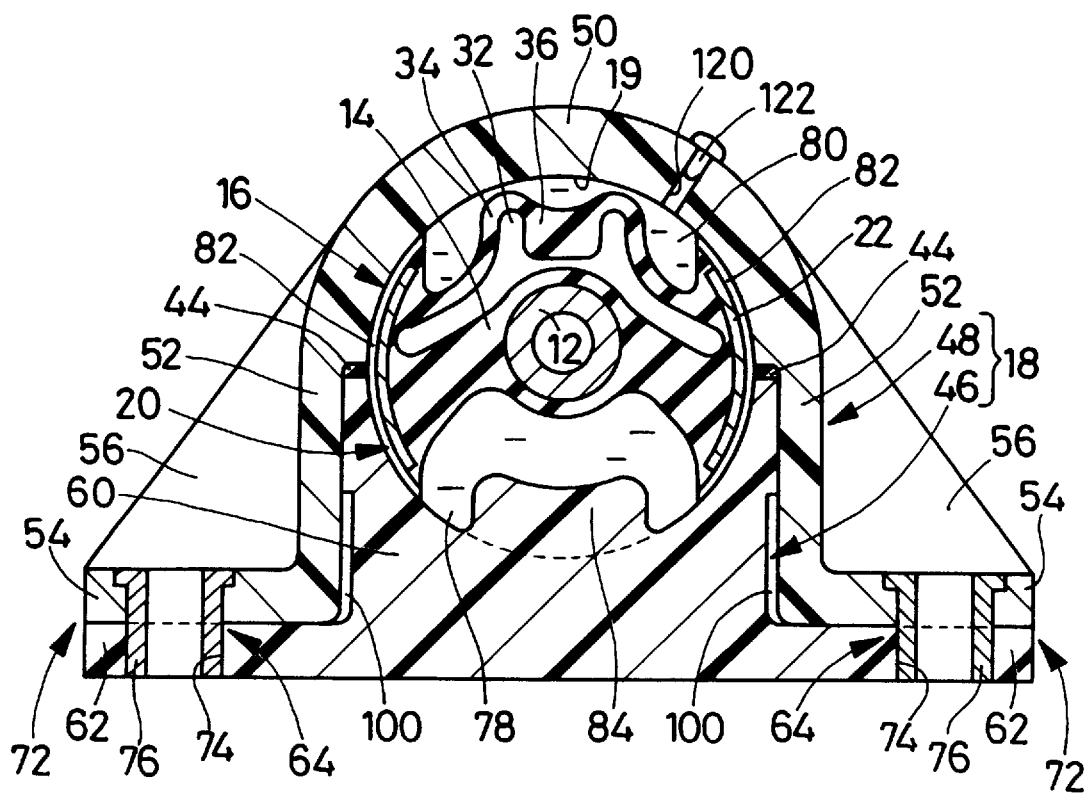
FIG. 19 is an elevational view in transverse cross section of an engine mount according to a further embodiment of this invention.

While the illustrated embodiments of FIGS. 1–18 are adapted to fill the fluid chambers 78, 80 with the non-compressible fluid by assembling the engine mount 10 within a mass of the non-compressible fluid, the fluid chambers may be filled by injecting the fluid into the fluid chambers through a suitable hole. For instance, a fluid injection hole 120 is formed through the wall of the semi-cylindrical portion 50 of the second member 48, as shown in FIG. 19. In this case, the fluid is injected into the fluid chambers 78, 80 through the injection hole 120 after the first and second members 46, 48 are fixed together. After the injection of the fluid into the fluid chambers, the injection hole 120 is closed by a suitable closure member, which may be a rivet 122 made of a thermoplastic resin material. Where the rivet 122 is used, the second member 48 is made of a thermoplastic resin material, and the rivet 122 is fixed to the open end of the hole 120 by ultrasonic welding. The rivet 122 may be a thermoplastic sheet fixed by ultrasonic welding to the second member 48. In the embodiment of FIG. 19, the attaching portions 72 also function as the fixing portions 64. Described more specifically, the attaching metal sleeves 76 are first heated by induction heating, and inserted into the holes 74 formed through the mutually superposed fixing plate portions 62, 54 of the first and second members 46, 48, whereby the fixing plate portions 62, 54 are fixed together by fusion welding.

In the illustrated embodiments, the engine mount 10 has the pressure-receiving chamber 78 and the equilibrium chamber 80 which communicate with each other through the orifice passages 82. However, the principle of the present invention is equally applicable to various types of fluid-filled elastic cylindrical mount, such as a mount having two pressure-receiving chambers communicating with each other through an orifice passage, a mount having a plurality of equilibrium chambers communicating with a pressure-receiving chamber through respective orifice passages, and a mount filled with a high-viscosity fluid (having a viscosity of 1–10 Pa·s) and adapted to provide a damping effect on the basis of a shearing stress of the high-viscosity fluid.

In the illustrated embodiments, the orifice passages 82 are provided by the arcuate grooves 42 which are defined by the outer circumferential surface of the intermediate sleeve 20 and the two sealing rubber layers 38 and which are closed by the outer sleeve portion 18, 118. However, orifice passages may be provided by arcuate grooves which are formed in the inner circumferential surface of the outer sleeve portion and which are closed by the outer circumferential surface of the core portion 16. In this case, the arcuate grooves can be comparatively easily formed in the part-cylindrical inner surfaces of the appropriate sections of the outer sleeve portion before these sections are fixed together into the outer sleeve portion. Further, the provision of the arcuate grooves in the separate sections of the outer sleeve portion eliminates special members or special processing (e.g., forming sealing rubber layers 38 so as to form the arcuate grooves 42) on the core portion 16 for providing orifice passages.

While the illustrated embodiments of this invention are all engine mounts for an automotive vehicle, it is to be understood that the principle of the invention is equally applicable to suspension bushings for the automotive vehicles, and various other types of fluid-filled elastic cylindrical mounts such as those used in devices or equipment other than the automotive vehicles.

It is to be further understood that the present invention may be embodied with various other changes, modifications and improvements, which may occur to those skilled in the art, without departing from the spirit and scope of the invention defined in the following claims.

What is claimed is:

1. A fluid-filled elastic cylindrical mount to be interposed between two members of a vibration system, said mount comprising: (a) a generally cylindrical core portion including a center shaft member fixed to one of said two members, an intermediate sleeve disposed radially outwardly of said center shaft member with a predetermined radial spacing therebetween, and an elastic body interposed between and connecting said center shaft member and said intermediate sleeve, said core portion having at least one pocket open in an outer circumferential surface thereof; and (b) an outer sleeve portion fixed to the other of said two members and having a cylindrical bore in which said core portion is fixedly received, whereby said center shaft member and said outer sleeve portion are elastically connected to each other by said elastic body, and said at least one pocket is closed by said outer sleeve portion to provide at least one fluid chamber filled with a non-compressible fluid, wherein the improvement comprises:

said outer sleeve portion consisting of a first member and a second member having respective part-cylindrical inner surfaces which cooperate to define said cylindrical bore;

said first and second members having respective two first pairs of abutting surfaces that extend substantially in parallel with an axis of said outer sleeve portion and at which said first and second members are butted together, said abutting surfaces being contiguous to said part-cylindrical inner surfaces;

a sealing member squeezed by and between said two first pairs of abutting surfaces of said first and second members, respectively; and said first and second members having respective fixing portions that are spaced away from said sealing member and at which said first and second members are fixed to each other; and said first and second members having respective two second pairs of abutting surfaces, the abutting surfaces of each of said two first pairs extending from a cylindrical inner surface of said cylindrical bore in a first diametric direction of said cylindrical bore, the abutting surfaces of each of said two second pairs extending in a direction parallel to a second diametric direction of said cylindrical bore that is substantially perpendicular to said first diametric direction, said first and second members being butted together at said two first pairs of abutting surfaces in said second diametric direction and at said two second pairs of abutting surfaces in said first diametric direction.

2. A fluid-filled elastic cylindrical mount according to claim 1, wherein at least one of said first and second members of said outer sleeve portion has an integrally formed inward projection extending from said part-cylindrical inner surface in a radially inward direction thereof.

3. A fluid-filled elastic cylindrical mount according to claim 2, wherein said inward projection is positioned so as to project into said at least one fluid chamber.

4. A fluid-filled elastic cylindrical mount according to claim 1, wherein at least one of said first and second members of said outer sleeve portion is formed of a thermoplastic resin material, and said first and second members are fixed to each other at said fixing portions by welding.

5. A fluid-filled elastic cylindrical mount according to claim 1, wherein both of said first and second members of said outer sleeve portion are formed of a thermoplastic resin material, and said first and second members are fixed to each other at said fixing portions by direct ultrasonic welding.

6. A fluid-filled elastic cylindrical mount according to claim 1, wherein both of said first and second members of said outer sleeve portion are formed of a thermoplastic resin material, and said first and second members are fixed to each other at said fixing portions by metallic attaching members that are welded so as to extend through said fixing portions for attaching said outer sleeve portion to said other of said two members of said vibration system.

7. A fluid-filled elastic cylindrical mount according to claim 1, wherein said first and second members of said outer sleeve portion consist of a first member held in abutting contact with said other of said two members on said vibration system, and a second member that is partially superposed on said first member and that is fixed to said other member, with said first member being interposed between said other member and said second member.

8. A fluid-filled elastic cylindrical mount according to claim 1, wherein said outer sleeve portion includes an integrally formed bracket at which said outer sleeve portion is fixed to said other of said two members of said vibration system.

9. A fluid-filled elastic cylindrical mount according to claim 1, wherein said outer sleeve portion has a fluid injecting hole formed therethrough for injecting said non-compressible fluid into said at least one fluid chamber, said outer sleeve portion including a closure member which closes said fluid injection hole and which is fixed to said outer sleeve portion by welding.

10. A fluid-filled elastic cylindrical mount according to claim 1, wherein said first and second members of said outer sleeve portion are fixed to each other and fitted on an outer circumferential surface of said core portion within a mass of said non-compressible fluid, so that said at least one fluid chamber is filled with said non-compressible fluid.

11. A fluid-filled elastic cylindrical mount according to claim 1, wherein said at least one fluid chamber consists of a plurality of fluid chambers, and said core portion has at least one groove formed in an outer circumferential surface thereof and closed by said outer sleeve portion to define at least one orifice passage for fluid communication between said plurality of fluid chambers.

12. A fluid-filled elastic cylindrical mount according to claim 1, wherein said sealing member is formed integrally with said core portion such that said sealing member protrudes from an outer circumferential surface of said core portion.

13. A fluid-filled elastic cylindrical mount according to claim 1, wherein said sealing member extends over a substantially entire axial length of said core portion.

14. A fluid-filled elastic cylindrical mount according to claim 1, wherein said core portion has two circumferential sealing layers that are formed on an outer circumferential surface of said intermediate sleeve and that are disposed on opposite sides of said at least one pocket as viewed in an axial direction of said intermediate sleeve, said circumferential sealing layers being squeezed by and between said outer circumferential surface of said intermediate sleeve and said part-cylindrical inner surfaces of said first and second members of said outer sleeve portion.

15. A fluid-filled elastic cylindrical mount according to claim 1, wherein said outer sleeve portion includes at least one integrally formed engaging projection each of which engages said core portion and which is adjacent to a portion of said intermediate sleeve in an axial direction of said intermediate sleeve.

16. A fluid-filled elastic cylindrical mount according to claim 16, further comprising an axial sealing layer which is squeezed by and between said intermediate sleeve and said each engaging projection in said axial direction.

17. A fluid-filled elastic cylindrical mount according to claim 15, wherein each of said at least one engaging projection projects into said at least one pocket and engages an axial end of said intermediate sleeve.

18. A fluid-filled elastic cylindrical mount according to claim 15, wherein said intermediate sleeve has a recess in an outer circumferential surface thereof, and each of said at least one engaging projection is positioned within said recess.

19. A fluid-filled elastic cylindrical mount according to claim 1, wherein said first member has a first substantially semi-cylindrical inner surface, while said second member has a second substantially semi-cylindrical inner surface that cooperates with said first substantially semi-cylindrical inner surface to define said cylindrical bore, the abutting surfaces of one of said two first pairs being formed at opposite ends of said first substantially semi-cylindrical inner surface, the abutting surfaces of the other one of said two first pairs being formed at opposite ends of said second substantially semi-cylindrical inner surface, said respective fixing portions of said first and second members being superposed on each other in said second diametric direction in which said two second pairs of abutting surfaces extend.

20. A fluid-filled elastic cylindrical mount according to claim 19, wherein said first member has a first portion providing one of said two second pairs of abutting surfaces, while said second member has a second portion providing the other of two second pairs of abutting surfaces, said first portion being located inwardly of said second portion.

21. A fluid-filled elastic cylindrical mount according to claim 19, wherein said first and second members have respective surfaces defining at least one gap formed adjacent said abutting surfaces of said two second pairs.

22. A fluid-filled elastic cylindrical mount according to claim 21, wherein said first and second members cooperate to define two gaps corresponding to the two abutting surfaces of each of said two second pairs.

* * * * *